(12) United States Patent
Ouchi et al.

(10) Patent No.: US 12,427,678 B2
(45) Date of Patent: Sep. 30, 2025

(54) HOLDING DEVICE, CONTROL METHOD, CONTROL DEVICE, AND ROBOT SYSTEM

(71) Applicant: Kawasaki Jukogyo Kabushiki Kaisha, Kobe (JP)

(72) Inventors: Satoshi Ouchi, Kobe (JP); Yuna Takahashi, Kobe (JP); Kazunori Hirata, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 793 days.

(21) Appl. No.: 17/780,704

(22) PCT Filed: Nov. 27, 2020

(86) PCT No.: PCT/JP2020/044328
§ 371 (c)(1),
(2) Date: May 27, 2022

(87) PCT Pub. No.: WO2021/107130
PCT Pub. Date: Jun. 3, 2021

(65) Prior Publication Data
US 2023/0356411 A1 Nov. 9, 2023

(30) Foreign Application Priority Data
Nov. 29, 2019 (JP) ................. 2019-216155

(51) Int. Cl.
*B25J 15/06* (2006.01)
*B25J 9/16* (2006.01)
*B25J 15/00* (2006.01)

(52) U.S. Cl.
CPC ......... *B25J 15/0616* (2013.01); *B25J 9/1615* (2013.01); *B25J 9/1682* (2013.01); *B25J 15/0061* (2013.01)

(58) Field of Classification Search
CPC ................. B25J 15/0052; B25J 15/0061; B25J 15/0616; B25J 9/1615; B25J 9/1682; B25J 17/02; G05B 2219/39109
See application file for complete search history.

(56) References Cited

U.S. PATENT DOCUMENTS 12,115,684 B2 * 10/2024 Ouchi ................. B25J 11/005
2009/0025199 A1 1/2009 Hariki et al.
(Continued)

FOREIGN PATENT DOCUMENTS

DE 10 2018 108 195 A1 10/2018
DE 11 2018 001 032 T5 12/2019
(Continued)

*Primary Examiner* — Sang K Kim
(74) *Attorney, Agent, or Firm* — XSENSUS LLP

(57) ABSTRACT

A holding device that holds a plate-shaped member having flexibility includes: a first suction structure that sucks the plate-shaped member; a second suction structure that sucks the plate-shaped member and is turnable and movable; a turning device that turns the second suction structure and a moving device that moves the second suction structure. When the first suction structure and the second suction structure suck and hold the plate-shaped member, the turning device twists the plate-shaped member by turning the second suction structure such that the second suction structure is directed in a direction different from the first suction structure, and the moving device bends the plate-shaped member by moving the second suction structure such that the second suction structure retreats relative to a direction along which the first suction structure and the second suction structure are located.

20 Claims, 15 Drawing Sheets

(56) References Cited

U.S. PATENT DOCUMENTS

2019/0351563 A1 11/2019 Bando et al.
2020/0086499 A1* 3/2020 Hibino ................ B65G 49/061

FOREIGN PATENT DOCUMENTS

| EP | 3 466 847 A1 | 4/2019 |
| JP | 2018-94712 A | 6/2018 |
| WO | 2015/033465 A1 | 3/2015 |
| WO | 2019/159713 A1 | 8/2019 |

* cited by examiner

HOLDING DEVICE, CONTROL METHOD, CONTROL DEVICE, AND ROBOT SYSTEM

CROSS-REFERENCE TO RELATED APPLICATION APPLICATIONS

This application is based on PCT filing PCT/JP2020/044328, filed on Nov. 27, 2020, and claims priority to and the benefit of Japanese Patent Application No. 2019-216155 filed on Nov. 29, 2019, the entire disclosure of each of which is incorporated herein by reference.

TECHNICAL FIELD

The present disclosure relates to a holding device, a control method, a control device, and a robot system.

BACKGROUND ART

Robots have been used to perform work instead of humans. For example, PTL 1 discloses a robot including a holding device used to, for example, pack foods in boxes. The robot of PTL 1 includes a right arm including a right hand and a left arm including a left hand. The right hand can hold the foods and change the posture of the foods. The right arm supplies the foods, held by the right hand, to a predetermined position. The left hand stacks and holds the supplied foods in a predetermined direction, and the left arm stores the foods, held by the left hand, in a container.

CITATION LIST

Patent Literature

PTL 1: Japanese Laid-Open Patent Application Publication No. 2018-94712

SUMMARY OF INVENTION

In PTL 1, the right hand and the left hand hold different foods and perform different works with respect to the foods. However, in some cases, the robot is required to hold one target object by, for example, two hands at two positions. Moreover, in some cases, the robot is required to apply an action to the target object held at two positions.

An object of the present disclosure is to provide a holding device, a control method, a control device, and a robot system, each of which can hold a target object at two positions and apply an action to the target object.

To achieve the above object, a holding device according to one aspect of the present disclosure is a holding device that holds a plate-shaped member having flexibility. The holding device includes: a first suction structure that sucks the plate-shaped member; a second suction structure that sucks the plate-shaped member and is turnable and movable; a turning device that turns the second suction structure; and a moving device that moves the second suction structure. When the first suction structure and the second suction structure suck and hold the plate-shaped member, the turning device twists the plate-shaped member by turning the second suction structure such that the second suction structure is directed in a direction different from the first suction structure, and the moving device bends the plate-shaped member by moving the second suction structure such that the second suction structure retreats relative to a direction along which the first suction structure and the second suction structure are located.

According to the technique of the present disclosure, the target object can be held at two positions, and the action can be applied to the target object.

DESCRIPTION OF EMBODIMENTS

Figure 1:
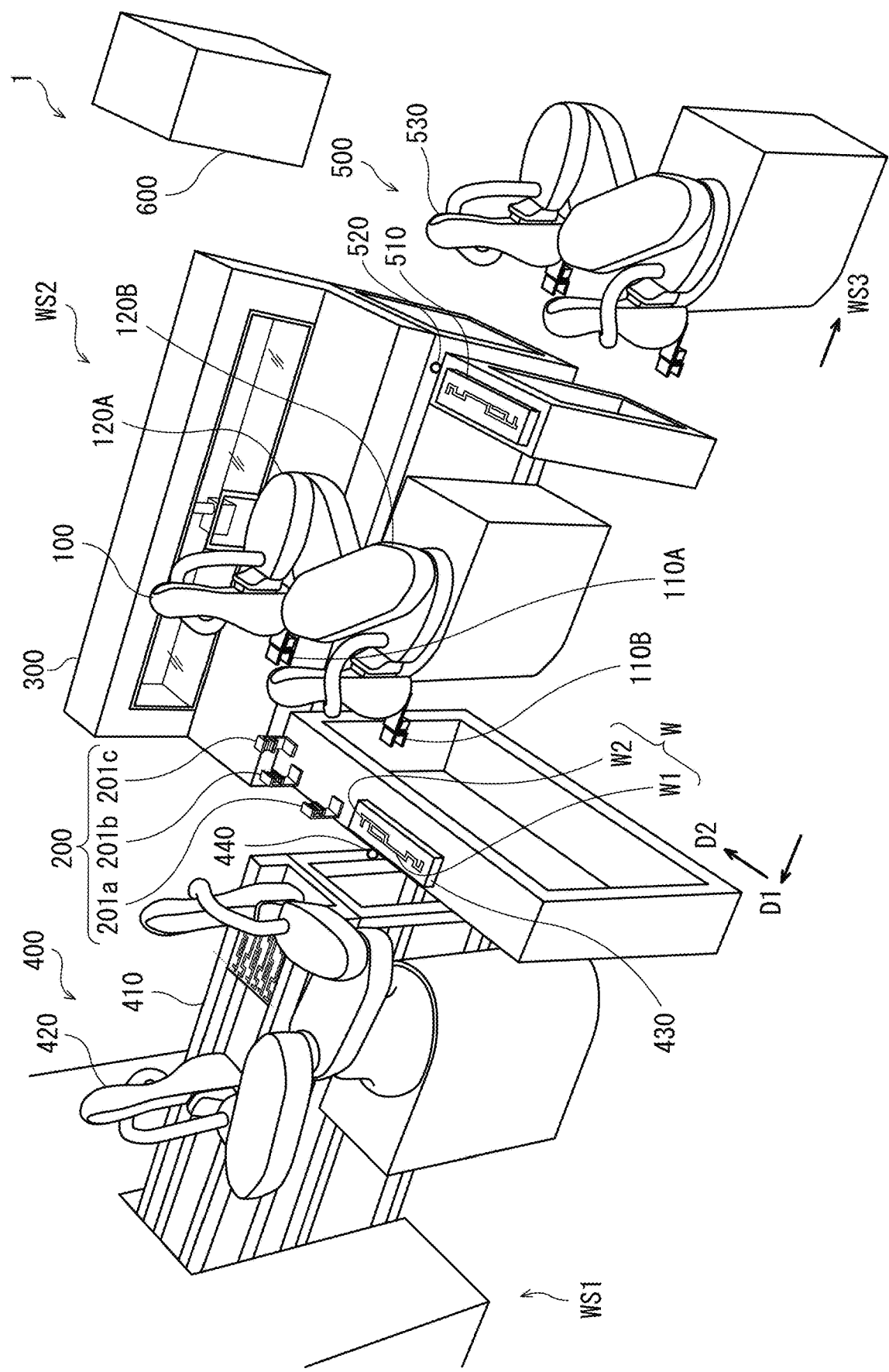
FIG. 1 is a perspective view showing one example of a robot system according to an embodiment.

First, examples of aspects of the present disclosure will be described. A holding device according to one aspect of the present disclosure is a holding device that holds a plate-shaped member having flexibility. The holding device includes: a first suction structure that sucks the plate-shaped member; a second suction structure that sucks the plate-shaped member and is turnable and movable; a turning device that turns the second suction structure; and a moving device that moves the second suction structure. When the first suction structure and the second suction structure suck and hold the plate-shaped member, the turning device twists the plate-shaped member by turning the second suction structure such that the second suction structure is directed in a direction different from the first suction structure, and the moving device bends the plate-shaped member by moving the second suction structure such that the second suction structure retreats relative to a direction along which the first suction structure and the second suction structure are located.

According to the above aspect, the first suction structure and the second suction structure can hold the plate-shaped member together by sucking the plate-shaped member at a first held portion and a second held portion which are held portions at two positions. Moreover, the held plate-shaped member receives, from the second suction structure, a twisting action and an action of retreating the second held portion. With this, the first held portion projects beyond the second held portion in a direction opposite to the retreating direction. Then, the above actions can suppress the load applied to the plate-shaped member. Therefore, the holding device can hold the plate-shaped member as the target object at two positions and apply the action to the plate-shaped member. Moreover, for example, when the projecting first held portion is introduced to the conveyance destination, such as a machining device, other portions of the plate-shaped member, the second suction structure, and the conveyance destination are prevented from interfering with each other.

In the holding device according to the aspect of the present disclosure, when twisting the plate-shaped member, the moving device may create a deflection on the plate-shaped member by moving the second suction structure such that the second suction structure approaches the first suction structure. According to the above aspect, since the plate-shaped member includes the deflection, the load applied to the plate-shaped member is suppressed when twisting the plate-shaped member and moving the second held portion.

In the holding device according to the aspect of the present disclosure, when twisting the plate-shaped member, the moving device may move the second suction structure to an upper side beyond the first suction structure. According to the above aspect, when the first held portion is introduced to and placed at the conveyance destination, the second held portion is prevented from interfering with a placement surface.

In the holding device according to the aspect of the present disclosure, the first suction structure may be arranged at a first robot arm. The second suction structure may be arranged at a second robot arm. The second robot arm may serve as the moving device. According to the above aspect, the second suction structure can be freely moved by the second robot arm.

In the holding device according to the aspect of the present disclosure, the first suction structure and the second suction structure may be arranged at one robot arm. According to the above aspect, the first suction structure and the second suction structure can be freely moved by the robot arm. Moreover, the action, such as twisting, can be applied to the plate-shaped member by the holding device arranged at one robot arm.

The holding device according to the aspect of the present disclosure may include: a support that supports the second suction structure; and a base that is attached to the robot arm and is coupled to the support such that the support is turnable. The turning device may turn the support. According to the above aspect, the second suction structure can be turned relative to the robot arm. For example, the second suction structure can be turned when the robot arm is in a stationary state.

In the holding device according to the aspect of the present disclosure, the base may be attached to a turnable end link of a tip of the robot arm, and a direction of a turning axis of the support may be a direction intersecting with a direction of a turning axis of the end link. According to the above aspect, the second suction structure can take various postures by the turning around the turning axis of the end link and the turning around the turning axis of the support.

The holding device according to the aspect of the present disclosure may further include: a second turning device as the turning device that turns the second suction structure; and a first turning device that turns the first suction structure. The first suction structure may be turnable. According to the above aspect, the holding of the plate-shaped member in various postures and the various changes of the posture of the held plate-shaped member are realized by the turning of the first suction structure and the second suction structure.

A control method according to one aspect of the present disclosure is a control method of conveying a plate-shaped member having flexibility by using a first robot arm including a first suction structure and a second robot arm including a second suction structure that is turnable by a turning device. The control method includes: operating the first robot arm to make the first suction structure suck the plate-shaped member; operating the second robot arm to make the second suction structure suck the plate-shaped member; operating the first robot arm and the second robot arm to lift and move the sucked plate-shaped member; operating the second robot arm to retreat the second suction structure relative to a direction along which the first suction structure and the second suction structure are located; operating the turning device to turn the second suction structure such that the second suction structure is directed in a direction different from the first suction structure; and operating the first robot arm and the second robot arm to move the plate-shaped member twisted by the turning of the second suction structure and introduce a portion of the plate-shaped member to a conveyance destination, the portion of the plate-shaped member being a portion sucked by the first suction structure.

According to the above aspect, the first and second robot arms can hold the plate-shaped member through the first and second suction structures, move the held portions of the plate-shaped member, and apply the action of twisting the plate-shaped member to the plate-shaped member. Moreover, the first and second robot arms can introduce the first held portion of the plate-shaped member to the conveyance destination while preventing interference among other portions of the plate-shaped member, the second suction structure, and the conveyance destination.

The control method according to the aspect of the present disclosure may further include: operating the first robot arm and the second robot arm to make a sensor, which detects a position of the plate-shaped member, detect the sucked plate-shaped member; and operating the first robot arm and the second robot arm based on a detection result of the sensor to adjust the position of the plate-shaped member relative to the conveyance destination. According to the above aspect, the position of the plate-shaped member relative to the first and second suction structures can be detected. With this, the positioning accuracy of the plate-shaped member relative to the conveyance destination by using the first and second robot arms can be improved.

In the control method according to the aspect of the present disclosure, the second suction structure may be attached to the second robot arm through a support and a base. The support may support the second suction structure. The base may be attached to the second robot arm and be coupled to the support such that the support is turnable. The turning device may turn the support. According to the above aspect, the second suction structure can be turned relative to the second robot arm. For example, the second suction structure can be turned when the second robot arm is in a stationary state.

In the control method according to the aspect of the present disclosure, the base may be attached to a turnable end link of a tip of the second robot arm, and a direction of a turning axis of the support may be a direction intersecting with a direction of a turning axis of the end link. According to the above aspect, the second suction structure can take various postures by the turning around the turning axis of the end link and the turning around the turning axis of the support.

In the control method according to the aspect of the present disclosure, the second suction structure may be turned by a second turning device as the turning device, and the first suction structure may be turnable and be turned by a first turning device. According to the above aspect, the holding of the plate-shaped member in various postures and the various changes of the posture of the held plate-shaped member are realized by the turning of the first suction structure and the second suction structure.

In the control method according to the aspect of the present disclosure, the conveyance destination may be a press-bonding device that press-bonds an electronic component to the plate-shaped member. According to the above aspect, the electronic component can be press-bonded to the first held portion of the plate-shaped member. Therefore, the control method is applicable to the machining of substrates.

A control device according to one aspect of the present disclosure is a control device that executes the control method according to the aspect of the present disclosure. According to the above aspect, the same effects as the control method according to the aspect of the present disclosure can be obtained.

A robot system according to one aspect of the present disclosure includes: a first robot arm; a second robot arm; a first suction structure arranged at the first robot arm; a second suction structure that is arranged at the second robot arm and is turnable; a turning device that turns the second suction structure; and a control device that controls operations of the first robot arm, the second robot arm, and the turning device. The control device operates the first robot arm and the second robot arm to suck and hold a plate-shaped member having flexibility by the first suction structure and the second suction structure. When the plate-shaped member is held, the control device operates the second robot arm to bend the plate-shaped member by retreating the second suction structure relative to a direction along which the first suction structure and the second suction structure are located, and the control device twists the plate-shaped member by making the turning device turn the second suction structure such that the second suction structure is directed in a direction different from the first suction structure. The control device operates the first robot arm and the second robot arm to move the twisted plate-shaped member and introduce a portion of the plate-shaped member to a conveyance destination, the portion of the plate-shaped member being a portion sucked by the first suction structure. According to the above aspect, the same effects as the control method according to the aspect of the present disclosure can be obtained.

A robot system according to one aspect of the present disclosure includes: a robot arm; a first suction structure arranged at the robot arm; a second suction structure that is arranged at the robot arm and is turnable; a turning device that turns the second suction structure; a moving device that moves the second suction structure; and a control device that controls operations of the robot arm, the turning device, and the moving device. The control device operates the robot arm to suck and hold a plate-shaped member having flexibility by the first suction structure and the second suction structure. When the plate-shaped member is held, the control device bends the plate-shaped member by making the moving device retreat the second suction structure relative to a direction along which the first suction structure and the second suction structure are located, and the control device twists the plate-shaped member by making the turning device turn the second suction structure such that the second suction structure is directed in a direction different from the first suction structure. The control device operates the robot arm to move the twisted plate-shaped member and introduce a portion of the plate-shaped member to a conveyance destination, the portion of the plate-shaped member being a portion sucked by the first suction structure. According to the above aspect, the same effects as the control method according to the aspect of the present disclosure can be obtained.

The robot system according to the aspect of the present disclosure may further include a sensor that detects a position of the plate-shaped member and outputs a detection result to the control device. The control device may detect a relative position of the plate-shaped member relative to the first suction structure and the second suction structure based on the detection result of the sensor and control a position of the plate-shaped member relative to the conveyance destination based on the relative position. According to the above aspect, the robot system can detect the position of the plate-shaped member relative to the first and second suction structures. With this, the robot system can position the plate-shaped member relative to the conveyance destination with a high degree of accuracy by using the robot arm.

In the robot system according to the aspect of the present disclosure, the second suction structure may be attached to the robot arm through a support and a base. The support may support the second suction structure. The base may be attached to the robot arm and be coupled to the support such that the support is turnable. The turning device may turn the support. According to the above aspect, the robot system can turn the second suction structure relative to the robot arm. For example, the second suction structure can be turned when the robot arm is in a stationary state.

In the robot system according to the aspect of the present disclosure, the base may be attached to a turnable end link of a tip of the robot arm, and a direction of a turning axis of the support may be a direction intersecting with a direction of a turning axis of the end link. According to the above aspect, the robot system can make the second suction structure take various postures by the turning around the turning axis of the end link and the turning around the turning axis of the support.

The robot system according to the aspect of the present disclosure may include: a second turning device as the turning device that turns the second suction structure; and a first turning device that turns the first suction structure. The first suction structure may be turnable. According to the above aspect, the robot system realizes the holding of the plate-shaped member in various postures and the various changes of the posture of the held plate-shaped member by turning the first suction structure and the second suction structure.

The robot system according to the aspect of the present disclosure may include a press-bonding device that is the conveyance destination and press-bonds an electronic component to the plate-shaped member. The control device may control an operation of the press-bonding device in association with an operation of introducing the plate-shaped member to the press-bonding device by the robot arm. According to the above aspect, the robot system can smoothly perform the operation of conveying and introducing the plate-shaped member to the press-bonding device and the operation of press-bonding the plate-shaped member by the press-bonding device as a series of operations in association with each other.

Embodiment

Hereinafter, embodiments of the present disclosure will be described with reference to the drawings. The embodiments described below are comprehensive or specific examples. Among components in the following embodiments, components that are not recited in independent claims which embody the broadest concept of the present disclosure will be described as optional components. The diagrams in the attached drawings are schematic diagrams and are not necessarily strictly drawn. In the diagrams, the same reference signs are used for the substantially identical components, and the repetition of the same explanation may be avoided, or such explanation may be simplified. In the present description and the claims, a "device" may denote not only a single device but also a system including devices.

Configuration of Robot System

The configuration of a robot system 1 according to the embodiment will be described. FIG. 1 is a perspective view showing one example of the robot system 1 according to the embodiment. As shown in FIG. 1, the robot system 1 according to the embodiment includes a robot 100, a position detector 200, a press-bonding device 300, conveying devices 400 and 500, and a control device 600. In the present embodiment, the following will describe a case where the robot 100 is arranged at a second workspace WS2 and performs one of steps of producing a substrate (also called a FPC (flexible printed substrate)) formed such that an electric circuit is formed on a workpiece W that is one example of a plate-shaped member having flexibility. In this step, the robot system 1 makes the robot 100 introduce the workpiece W, conveyed from a first workspace WS1 where another work step is performed, to the press-bonding device 300 that is a conveyance destination, and transfer the workpiece W, subjected to press-bonding of electronic components by the press-bonding device 300, to a third workspace WS3 where yet another work step is performed. Each of the number of robots 100, the number of position detectors 200, the number of press-bonding devices 300, the number of conveying devices 400, and the number of conveying devices 500 in the robot system 1 is not limited to one as shown in FIG. 1 and may be any number.

For example, the workpiece W of the FPC has such a configuration that a conductor having electrical conductivity is attached onto an insulation base film through an adhesive layer. The base film is made of plastic, such as polyimide or polyester. The adhesive layer is made of an adhesive such as an epoxy resin adhesive or acrylic resin adhesive, a prepreg, or the like. The conductor is made of copper foil, silver foil, or the like. A target object handled by the robot system 1 is not limited to the workpiece W of the FPC and may be a plate-shaped member having flexibility. The robot system 1 may be constructed so as to convey the plate-shaped member.

The control device 600 controls the entire robot system 1. Specifically, the control device 600 controls the robot 100, the position detector 200, the press-bonding device 300, and the conveying devices 400 and 500 such that the operations thereof are associated with each other. For example, the control device 600 includes a computer.

Figure 2:
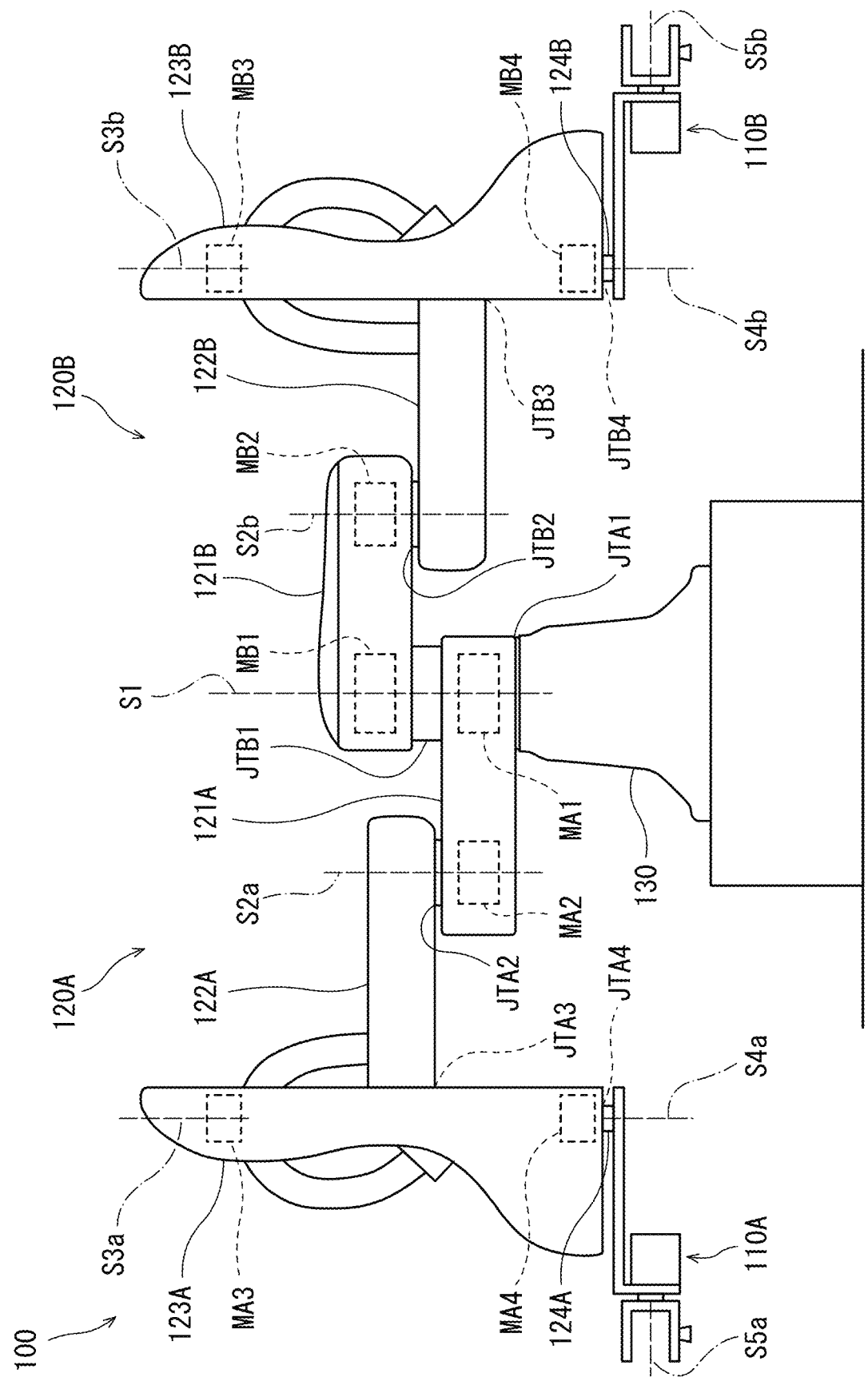
FIG. 2 is a side view showing one example of the configuration of a robot according to the embodiment.

FIG. 2 is a side view showing one example of the configuration of the robot 100 according to the embodiment. As shown in FIG. 2, in the present embodiment, the robot 100 is an industrial robot but is not limited to this. The robot 100 includes end effectors 110A and 110B, robot arms 120A and 120B, and a base 130. The end effectors 110A and 110B can apply actions to the workpiece W. The robot arms 120A and 120B can move the end effectors 110A and 110B such that the end effectors 110A and 110B execute the actions. The robot arms 120A and 120B are supported by the base 130 so as to be turnable. The robot 100 may include a device that moves the base 130.

The robot arms 120A and 120B are not especially limited as long as the robot arms 120A and 120B can move the end effectors 110A and 110B located at respective tips thereof. In the present embodiment, the robot arms 120A and 120B are horizontal articulated arms. The robot arms 120A and 120B may be vertical articulated robot arms, polar coordinate robot arms, cylindrical coordinate robot arms, rectangular coordinate robot arms, or other robot arms. The robot arms 120A and 120B are coaxially turnable in a horizontal plane about a first axis S1 extending in a vertical direction. The first robot arm 120A is arranged at a lower side of the second robot arm 120B in a direction along the first axis S1. Therefore, the robot 100 is a coaxial double-arm robot. Each of the robot arms 120A and 120B is one example of a moving device.

The first robot arm 120A includes links 121A to 124A, joints JTA1 to JTA4, and arm driving devices MA1 to MA4. The second robot arm 120B includes links 121B to 124B, joints JTB1 to JTB4, and arm driving devices MB1 to MB4. Each of the arm driving devices MA1 to MA4 and MB1 to MB4 includes, for example, an electric motor that uses electric power as a power source. In the present embodiment, each of the arm driving devices MA1 to MA4 and MB1 to MB4 includes a servomotor. The arm driving devices MA1 to MA4 and MB1 to MB4 respectively drive the joints JTA1 to JTA4 and JTB1 to JTB4 by control of the control device 600. Therefore, the robot arms 120A and 120B operate independently. Each of the number of joints of the robot arm 120A and the number of joints of the robot arm 120B is not limited to four and may be five or more or three or less.

The link 121A is connected to the base 130 through the rotary joint JTA1 so as to be turnable about the first axis S1 in a horizontal plane, and the link 121B is connected to the base 130 through the rotary joint JTB1 so as to be turnable about the first axis S1 in a horizontal plane. The link 122A is connected to a tip of the link 121A through the rotary joint JTA2 so as to be turnable in a horizontal plane about a second axis S2$a$ extending in the vertical direction, and the link 122B is connected to a tip of the link 121B through the rotary joint JTB2 so as to be turnable in a horizontal plane about a second axis S2$b$ extending in the vertical direction. The link 123A is connected to a tip of the link 122A through the linear-motion joint JTA3 so as to be able to move up and down along a third axis S3$a$ extending in the vertical direction, and the link 123B is connected to a tip of the link 122B through the linear-motion joint JTB3 so as to be able to move up and down along a third axis S3$b$ extending in the vertical direction. The link 124A is connected to a lower end of the link 123A through the rotary joint JTA4 so as to be turnable about a fourth axis S4$a$ extending in a longitudinal direction of the link 123A, and the link 124B is connected to a lower end of the link 123B through the rotary joint JTB4 so as to be turnable about a fourth axis S4b extending in a longitudinal direction of the link 123B. The fourth axes S4a and S4b are axes extending in the vertical direction. The link 124A includes a mechanical interface to be connected to the end effector 110A, and the link 124B includes a mechanical interface to be connected to the end effector 110B. Each of the links 124A and 124B is one example of an end link.

Herein, a "horizontal direction" denotes a horizontal direction when the robot 100 is arranged on a horizontal surface, such as a horizontal floor surface, and is also a direction parallel to the above surface. The "vertical direction" denotes a vertical direction in the same case as above and is also a direction perpendicular to the above surface. An "upper side" or "upward" denotes a direction from a lower side toward an upper side in the same case as above, and a "lower side" or "downward" denotes a direction from the upper side toward the lower side in the same case as above. A "lateral side" or "lateral" denotes a direction along the above surface in the same case as above.

Figure 3:
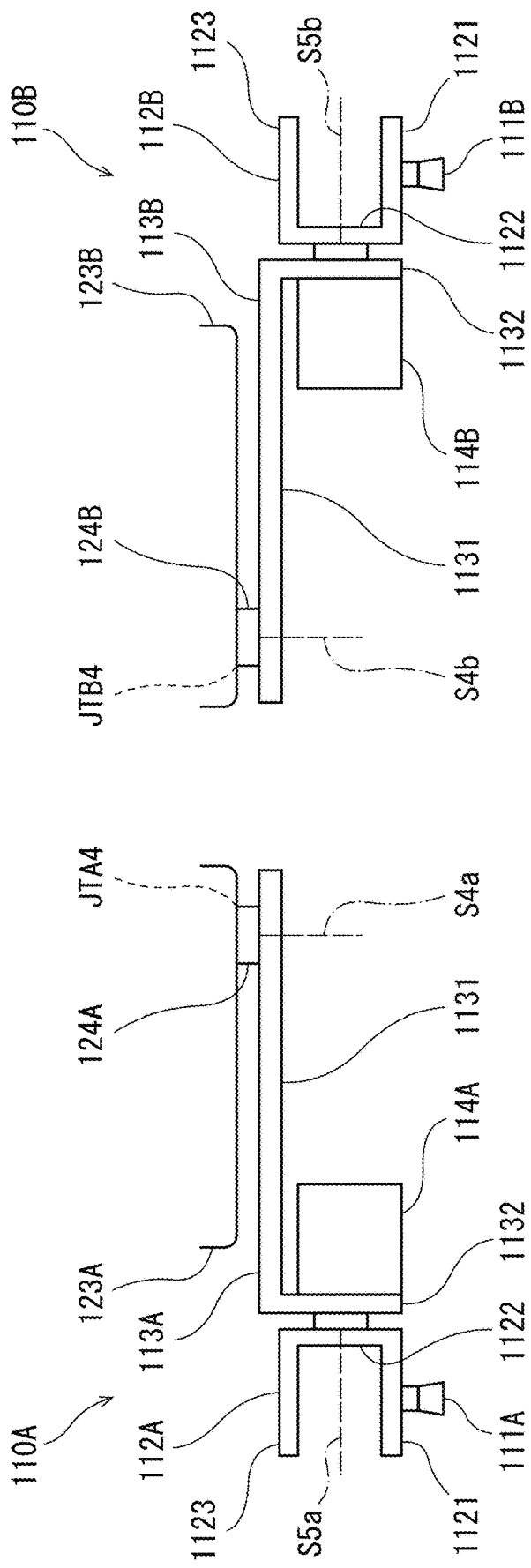
FIG. 3 is a side view showing one example of the configuration of an end effector according to the embodiment.

FIG. 3 is a side view showing one example of the configurations of the end effectors 110A and 110B according to the embodiment. In the present embodiment, the end effectors 110A and 110B are the same in configuration as each other. The end effector 110A includes a suction structure 111A, a support 112A, a base 113A, and a turning device 114A. The end effector 110B includes a suction structure 111B, a support 112B, a base 113B, and a turning device 114B. Each of the end effectors 110A and 110B is one example of a holding device.

Each of the suction structures 111A and 111B is not especially limited but has, for example, a hollow nozzle shape and is connected to a negative pressure generator 700 (see FIG. 5) through piping. An open end of the suction structure 111A sucks the target object, such as the workpiece W, by negative pressure generated inside the suction structure 111A by the negative pressure generator 700, and an open end of the suction structure 111B sucks the target object, such as the workpiece W, by negative pressure generated inside the suction structure 111B by the negative pressure generator 700. For example, the open ends of the suction structures 111A and 111B may be made of a material having flexibility or elasticity and/or have a hollow bellows shape, and be extensible and contractable. For example, the open ends of the suction structures 111A and 111B may include members, such as springs, having elasticity. For example, the open end of the suction structure 111A is extensible and contractable in a direction in which the suction structure 111A extends, and the open end of the suction structure 111B is extensible and contractable in a direction in which the suction structure 111B extends. The suction structures 111A and 111B that are extensible and contractable improve airtightness with respect to the workpiece W and realize secure suction. Moreover, even when the suction structures 111A and 111B are pressed against the workpiece W, damages of the workpiece W can be suppressed.

The configuration of the negative pressure generator 700 is not especially limited and may be any existing configuration as long as the negative pressure can be generated inside the suction structures 111A and 111B. For example, the negative pressure generator 700 may have the configuration of a vacuum pump or a pneumatic cylinder which sucks air to generate negative pressure or vacuum or may have the configuration of an ejector which is supplied with compressed air to generate negative pressure or vacuum. Driving of the negative pressure generator 700 is controlled by the control device 600.

Each of the supports 112A and 112B includes: two opposing portions 1121 and 1123 that are opposed to each other; and an intermediate portion 1122 connecting the opposing portions 1121 and 1123. For example, each of the supports 112A and 112B includes a plate-shaped member having a U-shaped section. The suction structure 111A is attached to the opposing portion 1121 of the support 112A and extends in a direction that is substantially perpendicular to the opposing portion 1121 and is opposite to a direction toward the opposing portion 1123. The suction structure 111B is attached to the opposing portion 1121 of the support 112B and extends in a direction that is substantially perpendicular to the opposing portion 1121 and is opposite to a direction toward the opposing portion 1123. The intermediate portion 1122 of the support 112A is coupled to the base 113A so as to be turnable about a fifth axis S5a, and the intermediate portion 1122 of the support 112B is coupled to the base 113B so as to be turnable about a fifth axis S5b. A direction along the fifth axis S5a is orthogonal to a direction along the fourth axis S4a but may be a direction intersecting with the direction along the fourth axis S4a. A direction along the fifth axis S5b is orthogonal to a direction along the fourth axis S4b but may be a direction intersecting with the direction along the fourth axis S4b. The opposing portion 1121 of the support 112A is located away from the fourth axis S4a and the fifth axis S5a, and the opposing portion 1121 of the support 112B is located away from the fourth axis S4b and the fifth axis S5b.

Each of the bases 113A and 113B includes a plate-shaped member having an L-shaped section. Each of the bases 113A and 113B includes a longer portion 1131 and a shorter portion 1132 which are substantially perpendicular to each other. The longer portion 1131 of the base 113A is detachably connected to the mechanical interface of the link 124A, and the longer portion 1131 of the base 113B is detachably connected to the mechanical interface of the link 124B. The shorter portion 1132 of the base 113A is coupled to the intermediate portion 1122 of the support 112A so as to be turnable, and the shorter portion 1132 of the base 113B is coupled to the intermediate portion 1122 of the support 112B so as to be turnable. The direction along the fifth axis S5a is substantially perpendicular to the shorter portion 1132 of the base 113A, and the direction along the fifth axis S5b is substantially perpendicular to the shorter portion 1132 of the base 113B. The shorter portion 1132 of the base 113A is located away from the fourth axis S4a, and the shorter portion 1132 of the base 113B is located away from the fourth axis S4b.

The turning device 114A is arranged at the shorter portion 1132 of the base 113A, is connected to the support 112A, and turns the support 112A. The turning device 114B is arranged at the shorter portion 1132 of the base 113B, is connected to the support 112B, and turns the support 112B. Each of the turning devices 114A and 114B includes, for example, an electric motor that uses electric power as a power source. In the present embodiment, each of the turning devices 114A and 114B includes a servomotor. Driving of the turning devices 114A and 114B is controlled by the control device 600.

According to the above configuration, the suction structure 111A can take various postures relative to the link 123A and can direct its open end in various directions by turning about the fourth axis S4a and turning about the fifth axis S5a, and the suction structure 111B can take various postures relative to the link 123B and can direct its open end in various directions by turning about the fourth axis S4b and turning about the fifth axis S5b. Moreover, the suction structure 111A can change its position by moving along the circumference of a circle about the fourth axis S4a and the circumference of a circle about the fifth axis S5a, and the suction structure 111B can change its position by moving along the circumference of a circle about the fourth axis S4b and the circumference of a circle about the fifth axis S5b.

As shown in FIG. 1, the first conveying device 400 is a device that conveys the workpiece W from the first workspace WS1 to the second workspace WS2. A step performed at the first workspace WS1 is a step performed before a step performed at the second workspace WS2. The first conveying device 400 includes a transfer device 410, a robot 420, a temporary placing base 430, and a conveyance sensor 440. The transfer device 410 conveys the workpiece W from the first workspace WS1 to a position in front of the robot 420 and is, for example, a conveyor belt. The robot 420 conveys the workpiece W and places the workpiece W at a predetermined position on the temporary placing base 430. The robot 420 is the same in configuration as the robot 100 but is not limited to this. The conveyance sensor 440 detects the workpiece W located at the predetermined position on the temporary placing base 430 and outputs a detection signal indicating this detection to the control device 600. Driving of the components, such as the transfer device 410 and the robot 420, of the first conveying device 400 is controlled by the control device 600.

The second conveying device 500 is a device that conveys the workpiece W from the second workspace WS2 to the third workspace WS3. A step performed at the third workspace WS3 is a step performed after the step performed at the second workspace WS2. The second conveying device 500 includes a temporary placing base 510, a conveyance sensor 520, and a robot 530. The temporary placing base 510 is a base on which the workpiece W subjected to the press-bonding by the press-bonding device 300 is placed. The workpiece W is conveyed and placed at a predetermined position on the temporary placing base 510 by the robot 100. The conveyance sensor 520 detects the workpiece W located at the predetermined position on the temporary placing base 510 and outputs a detection signal indicating this detection to the control device 600. The robot 530 conveys the workpiece W on the temporary placing base 510 to the third workspace WS3. The robot 530 is the same in configuration as the robot 100 but is not limited to this. Driving of the components, such as the robot 530, of the second conveying device 500 is controlled by the control device 600.

The configurations of the conveying devices 400 and 500 are not limited to the above configurations and may be able to convey the workpiece W between the workspaces. For example, instead of or in addition to the robot 420 or 530, each of the conveying devices 400 and 500 may include a conveyor belt, a carrier, a track device, a conveyance device including a ball screw structure, a conveyance device including a rack-and-pinion structure, and/or the like. Each of the conveyance sensors 440 and 520 may be a sensor that can detect the existence of the workpiece W, and may be, for example, a photoelectronic sensor (also called a "beam sensor"), a laser sensor, a limit switch, a contact sensor, or the like.

The position detector 200 is arranged in a work range of the robot 100. The position detector 200 detects the position of the workpiece W held by the end effectors 110A and 110B and outputs a detection result to the control device 600. The position detector 200 includes sensors that detect the workpiece W. In the present embodiment, the position detector 200 includes three sensors 201a to 201c. The sensors 201a to 201c are arranged at respective height positions that are the same in height as each other in the vertical direction. The sensors 201a to 201c are arranged so as to form sides of a right angled triangle, the sides extending in the horizontal direction. The sensors 201a and 201b are arranged on a long side of the right angled triangle so as to be spaced apart from each other. The sensor 201c is arranged on a short side of the right angled triangle. Hereinafter, a horizontal direction along the long side is called a second direction D2, and a horizontal direction along the short side is called a first direction D1. The first direction D1 is a direction from the robot 100 toward the position detector 200, and the second direction D2 is a direction that is perpendicular to the first direction D1 and crosses a position in front of the robot 100.

Each of the sensors 201a to 201c may detect the position of the workpiece W relative to the sensor and may be a photoelectronic sensor, a laser sensor, or the like. For example, each of the sensors 201a to 201c includes a light emitter and a light receiver which are arranged so as to be opposed to each other in the vertical direction and detects the workpiece W located between the light emitter and the light receiver.

Figure 4:
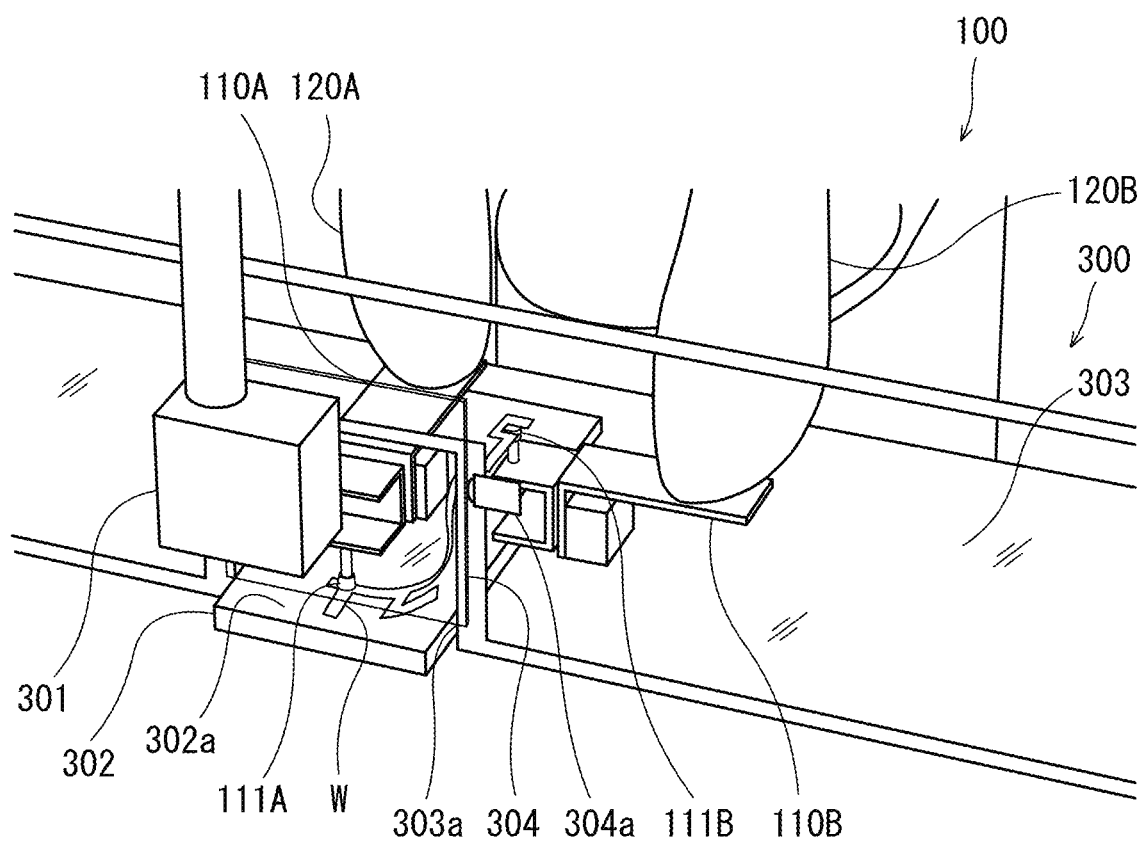
FIG. 4 is a perspective view showing one example of the configuration of a press-bonding device according to the embodiment when viewed from an inner side toward an outer side.

FIG. 4 is a perspective view showing one example of the configuration of the press-bonding device 300 according to the embodiment when viewed from an inner side toward an outer side. As shown in FIGS. 1 and 4, the press-bonding device 300 press-bonds electronic components, specifically, terminals, connectors, tabs, and the like on an end of the workpiece W.

The press-bonding device 300 includes a press-bonding body 301, a receiving base 302, a partition wall 303, and an open-close window 304. The partition wall 303 is a wall that separates an inside and outside of the press-bonding device 300 from each other and includes an opening 303a penetrating the partition wall 303. The open-close window 304 is slidable in an upper-lower direction and slides to open or close the opening 303a. A window driving device 304a is controlled by the control device 600 to slide, i.e., lift or lower the open-close window 304. The configuration of the window driving device 304a may be any configuration as long as the window driving device 304a can lift or lower the open-close window 304. The partition wall 303 and the open-close window 304 include transparent members such that the inside of the press-bonding device 300 is visible from the outside. However, the present embodiment is not limited to this.

The receiving base 302 extends from the outside of the partition wall 303 to the inside of the partition wall 303 through the opening 303a. The receiving base 302 includes an upper surface 302a on which the workpiece W can be placed. The press-bonding body 301 is located inside the partition wall 303, is arranged at the upper side of the receiving base 302, and moves in the upper-lower direction. The press-bonding body 301 moves to the lower side to press its lower end against the receiving base 302. The press-bonding body 301 includes a heat generator (not shown). The press-bonding body 301 press-bonds the electronic component to the workpiece W by pressing and heating the workpiece W between the lower end of the press-bonding body 301 and the receiving base 302. Driving of the press-bonding body 301 for the movement and the heat generation is controlled by the control device 600.

Hardware Configuration of Control Device

Figure 5:
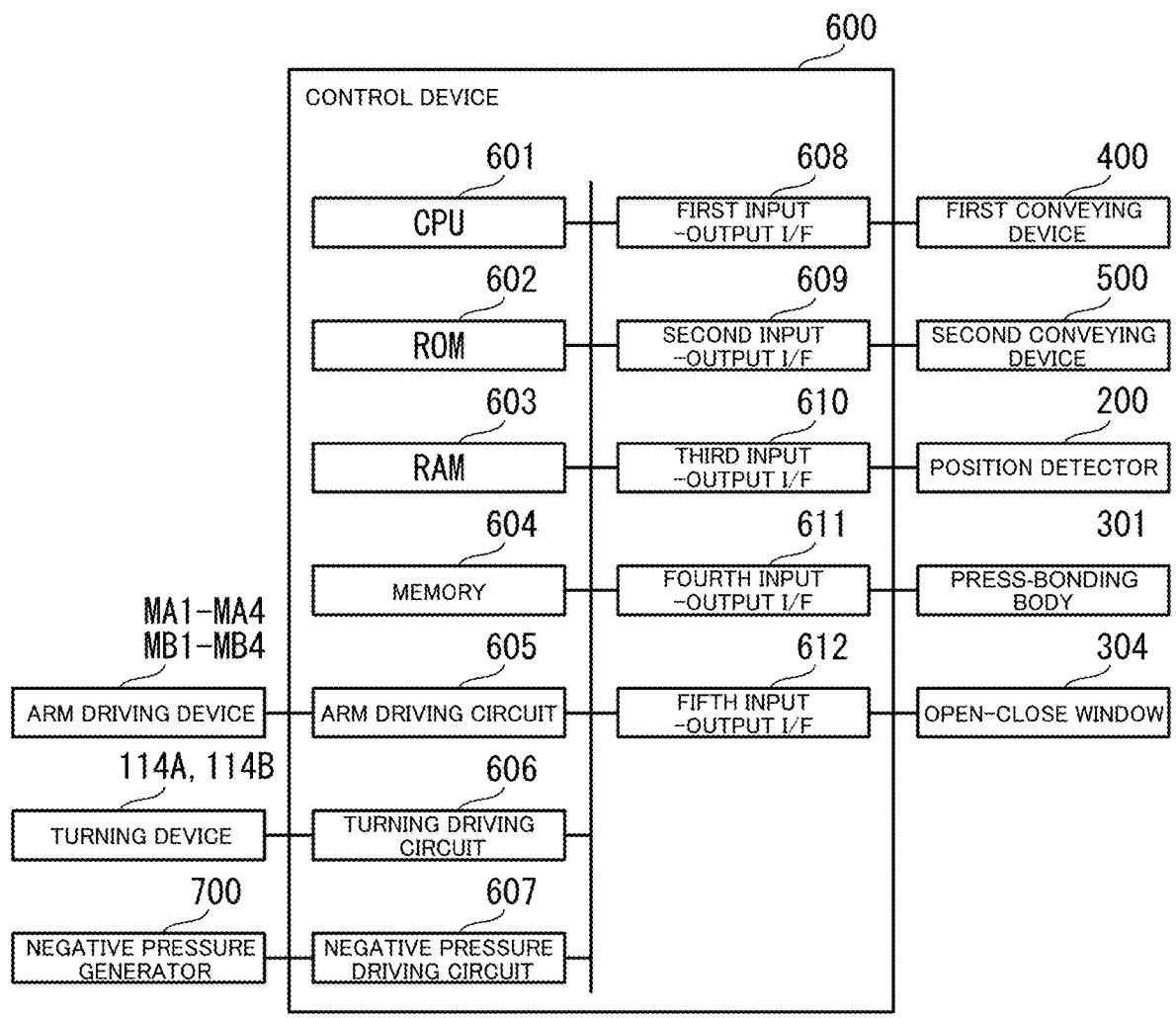
FIG. 5 is a block diagram showing one example of the hardware configuration of a control device according to the embodiment.

The hardware configuration of the control device 600 will be described. FIG. 5 is a block diagram showing one example of the hardware configuration of the control device 600 according to the embodiment. As shown in FIG. 5, the control device 600 includes a CPU (Central Processing Unit) 601, a ROM (Read Only Memory) 602, a RAM (Random Access Memory) 603, a memory 604, an arm driving circuit 605, a turning driving circuit 606, a negative pressure driving circuit 607, and input-output I/Fs (Interfaces) 608 to 612 as components. The above components are connected to each other through buses, wired communication, or wireless communication. Not all the components are essential. For example, some of the above components may be arranged outside the control device 600 and connected to the control device 600.

For example, the CPU 601 is a processor and controls the overall operation of the control device 600. The ROM 602 includes, for example, a non-volatile semiconductor memory and stores therein programs, data, and the like which make the CPU 601 control the operations. The RAM 603 includes, for example, a volatile semiconductor memory and temporarily stores therein the programs executed by the CPU 601, data in the middle of processing by the CPU 601, data after processing by the CPU 601, and the like. The memory 604 includes a storage device such as a semiconductor memory (such as a volatile memory or a non-volatile memory), a hard disk drive (HDD) or a SSD (Solid State Drive) and stores various kinds of information therein.

For example, the programs by which the CPU 601 operates are stored in the ROM 602 or the memory 604 in advance. The CPU 601 reads and expands the program from the ROM 602 or the memory 604 to the RAM 603. The CPU 601 executes coded commands in the program expanded in the RAM 603.

The functions of the control device 600 may be realized by a computer system including the CPU 601, the ROM 602, the RAM 603, and the like, may be realized by a dedicated hardware circuit, such as an electronic circuit or an integrated circuit, or may be realized by a combination of the computer system and the hardware circuit.

In accordance with the command of the CPU 601, the arm driving circuit 605 supplies electric power to the servomotors of the arm driving devices MA1 to MA4 and MB1 to MB4 of the robot arms 120A and 120B to control the driving of the servomotors. In accordance with the command of the CPU 601, the turning driving circuit 606 supplies electric power to the servomotors of the turning devices 114A and 114B of the end effectors 110A and 110B to control the servomotors. In accordance with the command of the CPU 601, the negative pressure driving circuit 607 controls the driving of the negative pressure generator 700 and the driving of an on-off valve (not shown) disposed at a pipe connecting the negative pressure generator 700 and the suction structure 111A and an on-off valve (not shown) disposed at a pipe connecting the negative pressure generator 700 and the suction structure 111B, to control the negative pressure generated at the suction structures 111A and 111B.

The first input-output I/F 608 is connected to the components, such as the transfer device 410, the robot 420, and the conveyance sensor 440, of the first conveying device 400 and receives or outputs information, data, commands, and the like from or to the components. The second input-output I/F 609 is connected to the components, such as the conveyance sensor 520 and the robot 530, of the second conveying device 500 and receives or outputs information, data, commands, and the like from or to the components. The third input-output I/F 610 is connected to the sensors 201a to 201c of the position detector 200 and receives or outputs commands, detection signals, and the like from or to the sensors 201a to 201c. The fourth input-output I/F 611 is connected to the press-bonding body 301 of the press-bonding device 300 and receives or outputs information, commands, and the like from or to the press-bonding body 301. The fifth input-output I/F 612 is connected to the window driving device 304a of the open-close window 304 of the press-bonding device 300 and receives or outputs information, commands, and the like from or to the window driving device 304a.

Functional Configuration of Control Device

Figure 6:
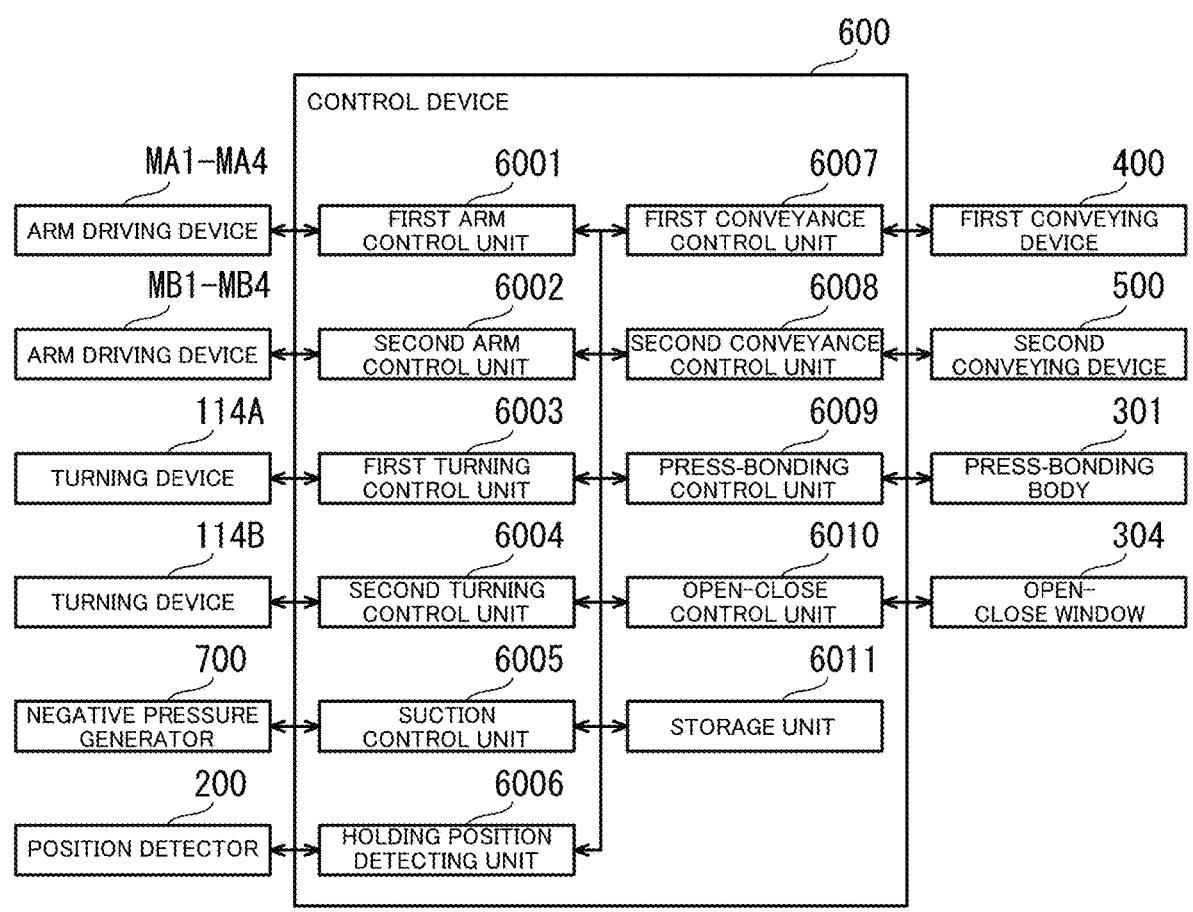
FIG. 6 is a block diagram showing one example of the functional configuration of the control device according to the embodiment.

The functional configuration of the control device 600 will be described. FIG. 6 is a block diagram showing one example of the functional configuration of the control device 600 according to the embodiment. As shown in FIG. 6, the control device 600 includes arm control units 6001 and 6002, turning control units 6003 and 6004, a suction control unit 6005, a holding position detecting unit 6006, conveyance control units 6007 and 6008, a press-bonding control unit 6009, an open-close control unit 6010, and a storage unit 6011 as functional components. Not all the functional components are essential.

The functions of the functional components except for the storage unit 6011 are realized by the CPU 601 or the like, and the functions of the storage unit 6011 are realized by the memory 604, the ROM 602, and/or the RAM 603. The storage unit 6011 stores various kinds of information therein, and allows the stored information to be read. For example, the storage unit 6011 may store therein programs which make the control device 600 operate. The storage unit 6011 may store therein workpiece information regarding the shape, size, and the like of the workpiece that is a conveyance target of the robot 100. The storage unit 6011 may store therein positional information regarding, for example, three-dimensional positions of the sensors 201a to 201c of the position detector 200. The three-dimensional positions are positions in a three-dimensional space where the robot system 1 is arranged.

The first arm control unit 6001 makes the first robot arm 120A autonomously execute predetermined work in accordance with the program. The first arm control unit 6001 outputs commands of operating the arm driving devices MA1 to MA4, to the arm driving devices MA1 to MA4. With this, the arm driving devices MA1 to MA4 drive such that the first robot arm 120A moves the first end effector 110A based on the position, posture, position movement speed, and posture movement speed corresponding to the predetermined work.

The second arm control unit 6002 makes the second robot arm 120B autonomously execute predetermined work in accordance with the program. The second arm control unit 6002 outputs commands of operating the arm driving devices MB1 to MB4, to the arm driving devices MB1 to MB4. With this, the arm driving devices MB1 to MB4 drive such that the second robot arm 120B moves the second end effector 110B based on the position, posture, position movement speed, and posture movement speed corresponding to the predetermined work.

Each of the arm driving devices MA1 to MA4 and MB1 to MB4 includes: a rotation sensor (not shown), such as an encoder, which detects a rotation amount of a rotor of the servomotor; and a current sensor (not shown) that detects a driving current of the servomotor. The arm control unit 6001 controls the driving, such as rotation start, rotation stop, rotational speed, and rotational torque, of the servomotors by using, as feedback information, the rotation amounts and driving current values output from the rotation sensors and current sensors of the servomotors. The arm control unit 6002 controls the driving, such as rotation start, rotation stop, rotational speed, and rotational torque, of the servomotors by using, as feedback information, the rotation amounts and driving current values output from the rotation sensors and current sensors of the servomotors. Each of the arm control units 6001 and 6002 may use, as the feedback information, a command value of the driving current output from the arm driving circuit 605 to each servomotor.

The first turning control unit 6003 makes the first end effector 110A autonomously execute predetermined work in accordance with the program. The first turning control unit 6003 outputs a command of operating the turning device 114A, to the turning device 114A. With this, the turning device 114A drives so as to move the first suction structure 111A based on the posture and posture movement speed corresponding to the predetermined work.

The second turning control unit 6004 makes the second end effector 110B autonomously execute predetermined work in accordance with the program. The second turning control unit 6004 outputs a command of operating the turning device 114B, to the turning device 114B. With this, the turning device 114B drives so as to move the second suction structure 111B based on the posture and posture movement speed corresponding to the predetermined work.

The turning control unit 6003 controls the driving of the servomotor included in the turning device 114A by using, as the feedback information, the rotation amount and driving current value output from the rotation sensor (not shown) and current sensor (not shown) of the servomotor. The turning control unit 6004 controls the driving of the servomotor included in the turning device 114B by using, as the feedback information, the rotation amount and driving current value output from the rotation sensor (not shown) and current sensor (not shown) of the servomotor. Each of the turning control units 6003 and 6004 may use, as the feedback information, the command value of the driving current output from the turning driving circuit 606 to each servomotor.

The suction control unit 6005 generates the negative pressure at the suction structures 111A and 111B in accordance with the program. The suction control unit 6005 controls the operation of the negative pressure generator 700 by outputting a command of operating the negative pressure generator 700, to the negative pressure generator 700. The suction control unit 6005 controls the negative pressure generated at the first suction structure 111A by outputting a command of operating the on-off valve (not shown) of the pipe communicating the first suction structure 111A with the negative pressure generator 700, to the on-off valve (not shown) of the pipe. The suction control unit 6005 controls the negative pressure generated at the second suction structure 111B by outputting a command of operating the on-off valve (not shown) of the pipe communicating the second suction structure 111B with the negative pressure generator 700, to the on-off valve (not shown) of the pipe.

The holding position detecting unit 6006 detects a relative positional relation among the end effectors 110A and 110B and the workpiece W held by the end effectors 110A and 110B. Specifically, the holding position detecting unit 6006 detects a relative positional relation among the suction structures 111A and 111B and the workpiece W. The control device 600 performs the positioning of the workpiece W during the operation of the robot 100 based on the above positional relation.

Specifically, when the control device 600 makes the robot 100 hold the workpiece W, the control device 600 makes the suction structures 111A and 111B suck the workpiece W at positions close to both ends of the workpiece W in a longitudinal direction. When the control device 600 makes the position detector 200 sense the held workpiece W, the control device 600 moves the workpiece W in the first direction D1 (see FIG. 1) and makes the sensors 201*a* and 201*b* detect an edge W1 of the workpiece W in the longitudinal direction and also moves the workpiece W in the second direction D2 (see FIG. 1) and makes the sensor 201*c* detect an edge W2 of the workpiece W in a transverse direction. The transverse direction is a direction orthogonal to the longitudinal direction.

The holding position detecting unit 6006 detects the positions and postures of the suction structures 111A and 111B at respective timings at which the sensors 201*a* to 201*c* detect the workpiece W. The positions and postures of the suction structures 111A and 111B may be three-dimensional positions and three-dimensional postures. The three-dimensional posture is a posture in a three-dimensional space where the robot system 1 is arranged. For example, the three-dimensional posture may be posture angles around three axes orthogonal to each other.

Moreover, the holding position detecting unit 6006 reads the workpiece information of the workpiece W and the positional information of the sensors 201*a* to 201*c* from the storage unit 6011. The holding position detecting unit 6006 detects relative positions and postures of the edges W1 and W2 of the workpiece W with respect to the suction structures 111A and 111B based on the shape and size of the workpiece W, the three-dimensional positions of the sensors 201*a* to 201*c*, and the positions and postures of the suction structures 111A and 111B at respective timings.

As above, the holding position detecting unit 6006 detects a relative positional relation among the workpiece W and the suction structures 111A and 111B by detecting the relative positions and postures of the edges W1 and W2 of the workpiece W with respect to the suction structures 111A and 111B.

The holding position detecting unit 6006 may detect the positions and postures of the suction structures 111A and 111B as below. The holding position detecting unit 6006 detects the position and posture of the first end effector 110A based on the detected values of the rotation sensors of the arm driving devices MA1 to MA4. For example, the position and posture of the first end effector 110A may be the three-dimensional position of a connecting portion between the first end effector 110A and the link 124A at a position of the fourth axis S4*a* and the three-dimensional posture of the connecting portion at a position of the fourth axis S4*a*. Moreover, the holding position detecting unit 6006 detects the position and posture of the first suction structure 111A based on the position and posture of the first end effector 110A and the detected value of the rotation sensor of the turning device 114A.

Similarly, the holding position detecting unit 6006 detects the position and posture of the second end effector 110B based on the detected values of the rotation sensors of the arm driving devices MB1 to MB4. Moreover, the holding position detecting unit 6006 detects the position and posture of the second suction structure 111B based on the position and posture of the second end effector 110B and the detected value of the rotation sensor of the turning device 114B.

The first conveyance control unit 6007 makes the transfer device 410 and the robot 420 of the first conveying device 400 autonomously convey the workpiece W in accordance with the program. For example, when the workpiece W on the temporary placing base 430 is removed by the robot 100, and therefore, the conveyance sensor 440 stops outputting the detection signal of the workpiece W, the first conveyance control unit 6007 outputs a command of conveying the workpiece W, to the robot 420. To be specific, the first conveyance control unit 6007 controls the driving of the transfer device 410 and the robot 420 such that each time the workpiece W is removed from the temporary placing base 430, the next workpiece W is conveyed to the temporary placing base 430. Instead of the detection signal of the conveyance sensor 440, the first conveyance control unit 6007 may receive, from the arm control unit 6001, 6002, or the like, information indicating that the workpiece W is removed from the temporary placing base 430, and may output the above command based on this information.

The second conveyance control unit 6008 makes the robot 530 of the second conveying device 500 autonomously convey the workpiece W in accordance with the program. For example, when the workpiece W is arranged on the temporary placing base 510 by the robot 100, and therefore, the conveyance sensor 520 outputs the detection signal of the workpiece W, the second conveyance control unit 6008 outputs a command of conveying the workpiece W, to the robot 530. To be specific, the second conveyance control unit 6008 controls the driving of the robot 530 such that each time the workpiece W is arranged on the temporary placing base 510, the workpiece W is conveyed to the third workspace WS3. Instead of the detection signal of the conveyance sensor 520, the second conveyance control unit 6008 may receive, from the arm control unit 6001, 6002, or the like, information indicating that the workpiece W is arranged on the temporary placing base 510, and may output the above command based on this information.

The open-close control unit 6010 makes the window driving device 304*a* autonomously open or close the open-close window 304 in accordance with the program. For example, as shown in FIG. 4, when the arrangement of the workpiece W on the receiving base 302 by the robot 100 is completed, the open-close control unit 6010 receives, from the arm control unit 6001, 6002, or the like, notice indicating that the arrangement is completed, and the open-close control unit 6010 outputs to the window driving device 304*a* a command of lowering the open-close window 304 to close the opening 303*a*. When the press-bonding with respect to the workpiece W by the press-bonding body 301 is completed, the open-close control unit 6010 receives, from the press-bonding control unit 6009, notice indicating that the press-bonding is completed, and the open-close control unit 6010 outputs to the window driving device 304*a* a command of lifting the open-close window 304 to open the opening 303*a*.

The press-bonding control unit 6009 makes the press-bonding body 301 autonomously perform the press-bonding with respect to the workpiece W in accordance with the program. For example, as shown in FIG. 4, when the window driving device 304*a* closes the opening 303*a* after the arrangement of the workpiece W on the receiving base 302 is completed, the press-bonding control unit 6009 receives, from the open-close control unit 6010, notice indicating that the closing is completed, and the press-bonding control unit 6009 outputs to the press-bonding body 301 a command of the heat generation and the lifting-lowering operation for the press-bonding. Moreover, when the press-bonding with respect to the workpiece W is completed, the press-bonding control unit 6009 outputs to the press-bonding body 301 a command of stopping the press-bonding body 301 at the upper side of the workpiece W and stopping the heat generation.

Operations of Robot System

Figure 7:
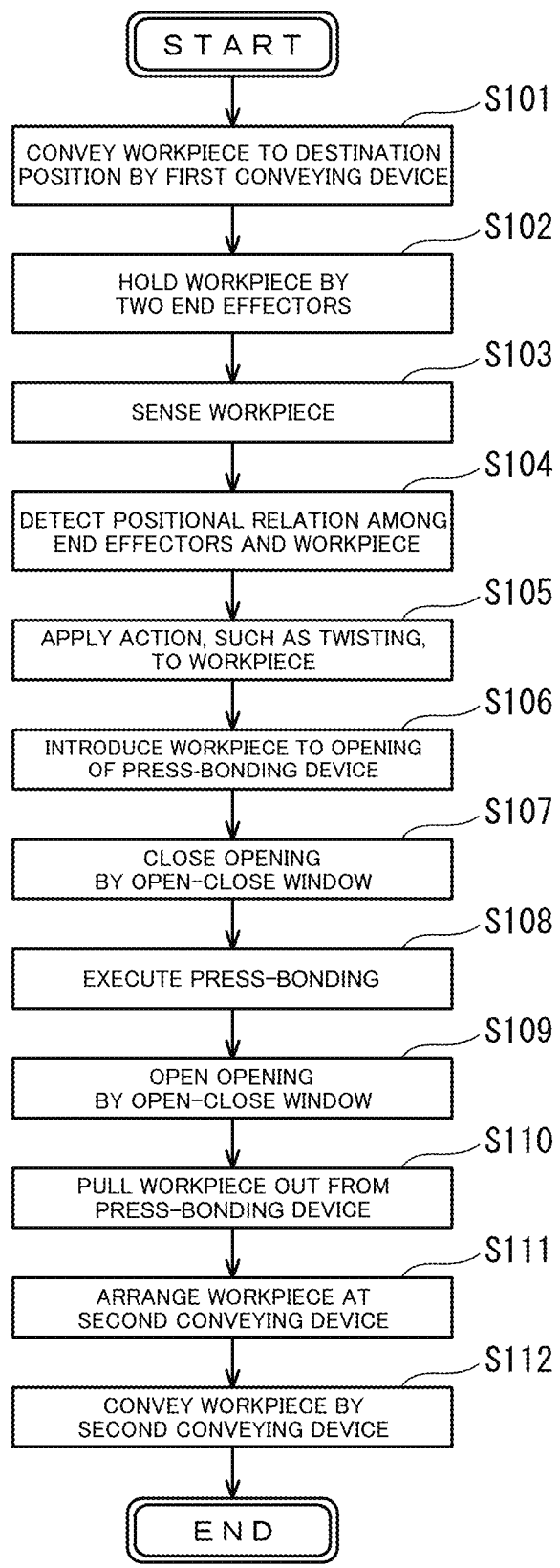
FIG. 7 is a flow chart showing one example of the operation of the robot system according to the embodiment.

The operations of the robot system 1 according to the embodiment will be described with reference to FIG. 7. FIG. 7 is a flow chart showing one example of the operation of the robot system 1 according to the embodiment. FIGS. 8 to 13 are perspective views each showing one example of the state of the robot system 1 that is operating in accordance with the flow chart of FIG. 7.

In Step S101, as shown in FIG. 1, the control device 600 makes the transfer device 410 of the first conveying device 400 convey the workpiece W from the first workspace WS1 to a position in front of the robot 420. Moreover, the control device 600 makes the robot 420 convey the workpiece W to the predetermined position on the temporary placing base 430, the predetermined position being a destination position of the second workspace WS2.

Figure 8:
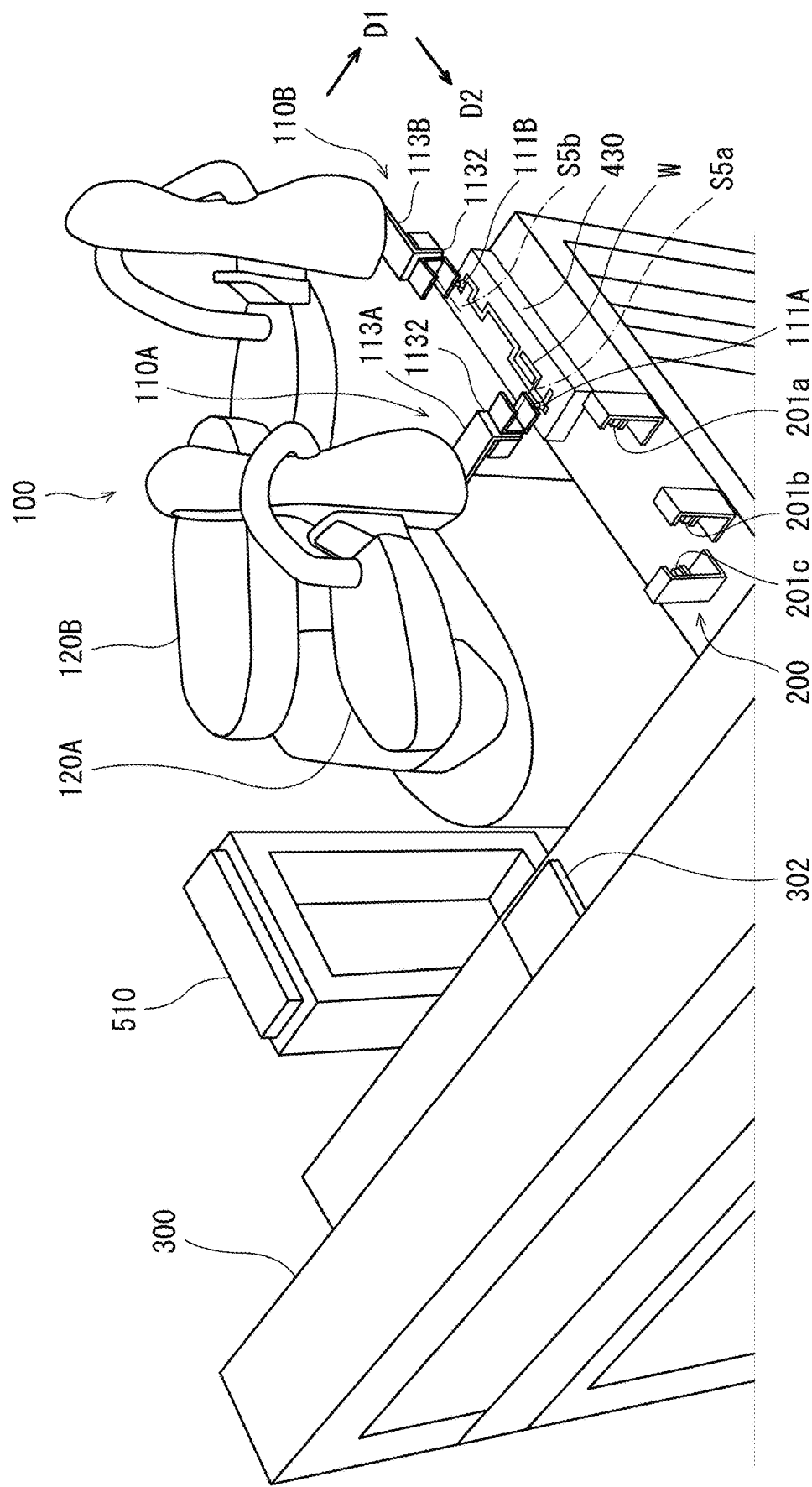
FIG. 8 is a perspective view showing one example of the state of the robot system that is operating in accordance with the flow chart of FIG. 7.

Next, in Step S102, as shown in FIG. 8, the control device 600 detects the existence of the workpiece W on the temporary placing base 430 based on the detection signal of the conveyance sensor 440 (see FIG. 1). After the detection, the control device 600 makes the robot arms 120A and 120B of the robot 100 move the end effectors 110A and 110B to the upper side of both ends of the workpiece W in the longitudinal direction and makes the end effectors 110A and 110B hold the workpiece W. Specifically, the control device 600 drives the negative pressure generator 700 (see FIG. 5) in advance. The control device 600 lowers the end effectors 110A and 110B located at the upper side of the workpiece W and opens the on-off valves (not shown) at a timing at which the suction structures 111A and 111B approach or contact both ends of the workpiece W. With this, the control device 600 makes the suction structures 111A and 111B suck the workpiece W.

At this time, the posture of the first end effector 110A is directed such that the shorter portion 1132 of the base 113A is directed in the first direction D1. The posture of the second end effector 110B is directed such that the shorter portion 1132 of the base 113B is directed in the second direction D2. The postures of the suction structures 111A and 111B are directed toward the lower side. Therefore, the fifth axis S5*a* extends along the first direction D1, and the fifth axis S5*b* extends along the second direction D2.

Figure 9:
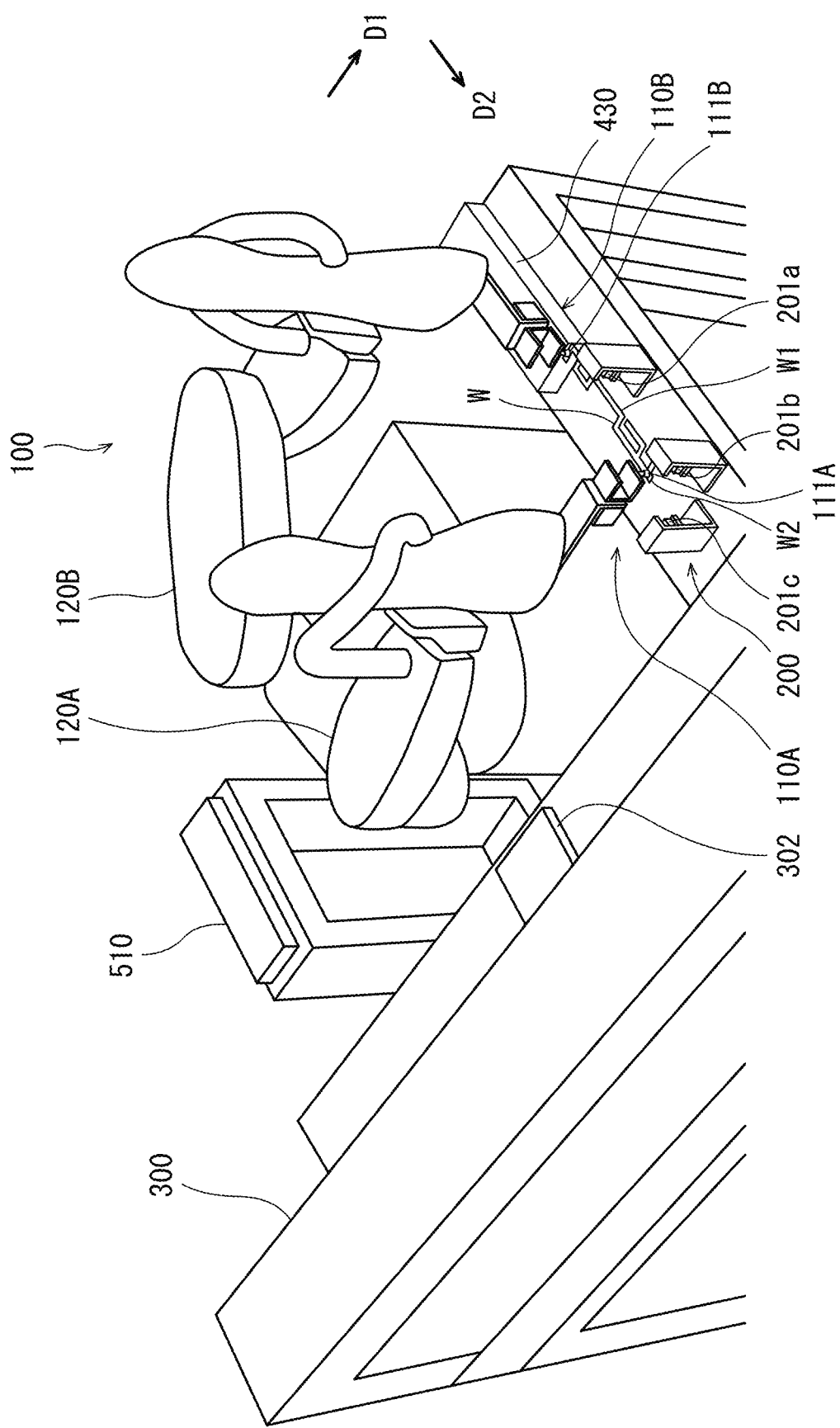
FIG. 9 is a perspective view showing one example of the state of the robot system that is operating in accordance with the flow chart of FIG. 7.

Next, in Step S103, as shown in FIG. 9, the control device 600 makes the robot arms 120A and 120B move the workpiece W to the position detector 200 and makes the position detector 200 sense the workpiece W. For example, the control device 600 moves the workpiece W in the first direction D1, and with this, makes the sensors 201*a* and 201*b* detect the edge W1 of the workpiece W. Moreover, the control device 600 moves the workpiece W in the second direction D2, and with this, makes the sensor 201*c* detect the edge W2 of the workpiece W.

Next, in Step S104, based on, for example, the detection results of the sensors 201*a* to 201*c*, the control device 600 detects a relative positional relation among the suction structures 111A and 111B and the workpiece W, i.e., a relative positional relation among the end effectors 110A and 110B and the workpiece W.

Figure 10:
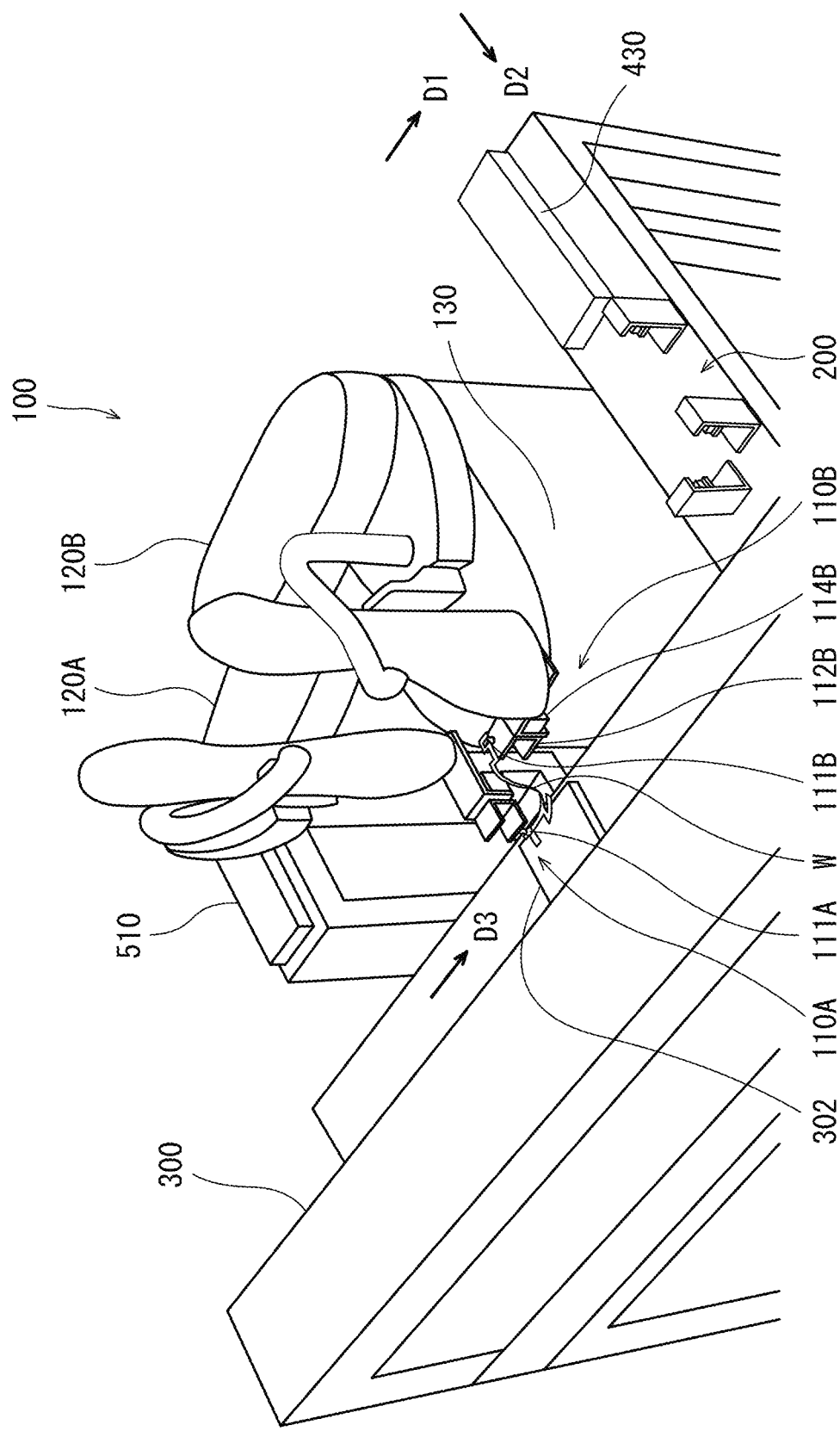
FIG. 10 is a perspective view showing one example of the state of the robot system that is operating in accordance with the flow chart of FIG. 7.

Next, in Step S105, as shown in FIG. 10, the control device 600 applies an action, such as twisting, to the workpiece W. Specifically, the control device 600 makes the robot arms 120A and 120B move the workpiece W to an outside of the position detector 200 and operates the second robot arm 120B and the second end effector 110B to twist the workpiece W. At this time, the control device 600 makes the second robot arm 120B move the second end effector 110B toward the first end effector 110A and the upper side.

Moreover, after or simultaneously with the above operation, the control device 600 makes the second robot arm 120B move the second end effector 110B such that the second end effector 110B retreats toward the base 130 relative to a third direction D3 that is an arrangement direction along which the suction structures 111A and 111B are located. The control device 600 makes the second end effector 110B retreat relative to a virtual line in a direction intersecting with the virtual line. The virtual line is a line along which the suction structures 111A and 111B are lined up in the third direction D3, i.e., the virtual line is a line extending in the arrangement direction. With this, the second suction structure 111B retreats toward the base 130 as compared to the first suction structure 111A. To be specific, the control device 600 creates a deflection on the workpiece W by moving the second suction structure 111B toward the first suction structure 111A and moves the second suction structure 111B toward the upper side and in a retreating direction. The third direction D3 is a horizontal direction. In FIG. 10, the third direction D3 is substantially parallel to the first direction D1.

Moreover, the control device 600 makes the turning device 114B turn the support 112B, and with this, changes the posture of the second suction structure 111B such that the second suction structure 111B is directed toward the upper side. Thus, the workpiece W is twisted. At this time, a first held portion of the workpiece W is located at the lower side of a second held portion of the workpiece W and farther from the base 130 than the second held portion of the workpiece W. The first held portion of the workpiece W is a portion sucked by the first suction structure 111A, and the second held portion of the workpiece W is a portion sucked by the second suction structure 111B.

Figure 11:
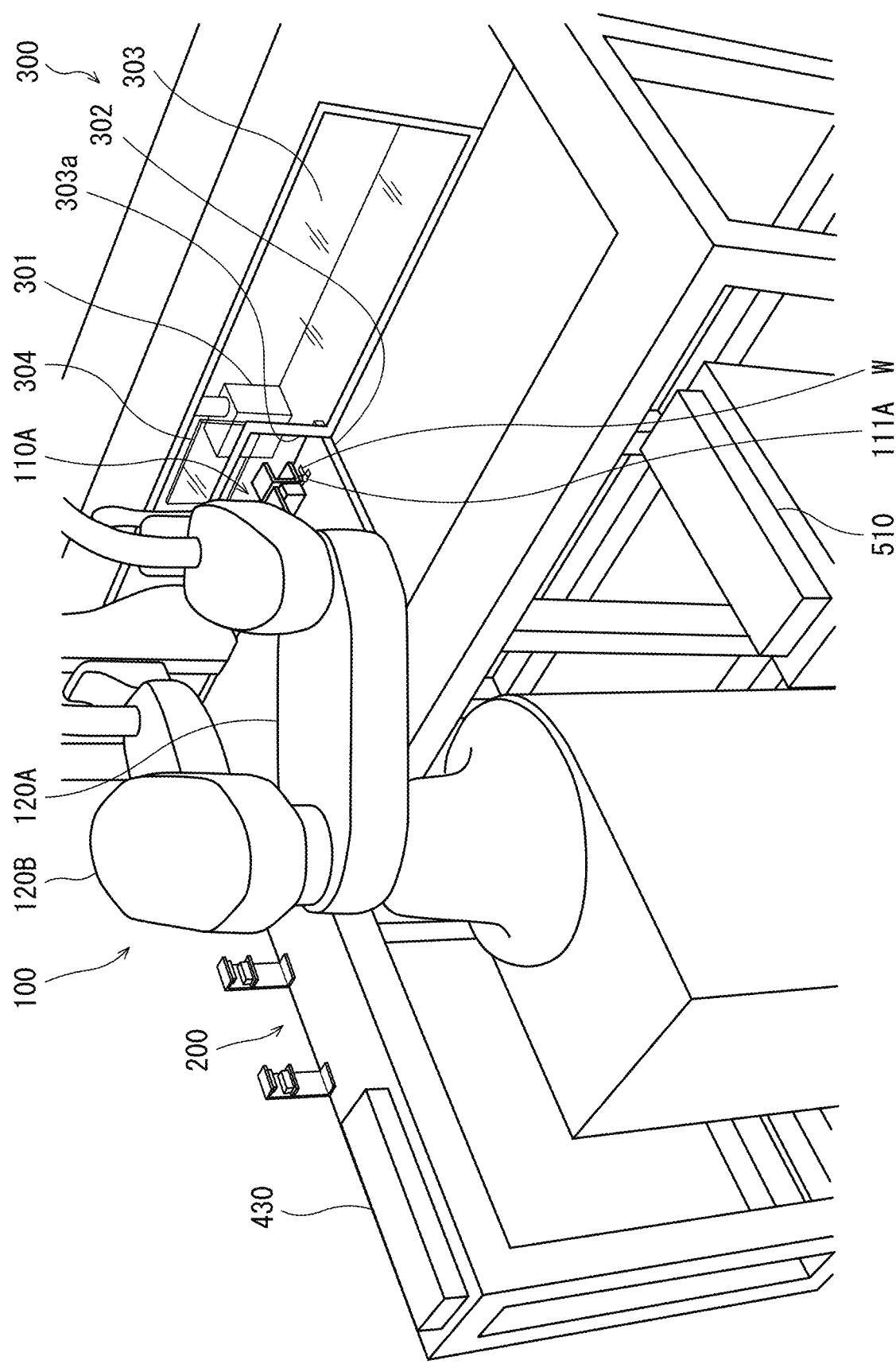
FIG. 11 is a perspective view showing one example of the state of the robot system that is operating in accordance with the flow chart of FIG. 7.

Next, in Step S106, as shown in FIG. 11, the control device 600 makes the robot arms 120A and 120B move the workpiece W to the press-bonding device 300. Moreover, the control device 600 makes the robot arms 120A and 120B introduce the first held portion of the workpiece W into the press-bonding device 300 through the opening 303a and place the workpiece W on the receiving base 302. At this time, since the second held portion of the workpiece W is located as described in Step S105, the second end effector 110B and portions of the workpiece W other than the first held portion are prevented from interfering with the partition wall 303.

Next, in Step S107, the control device 600 lowers the open-close window 304 to close the opening 303a.

Figure 12:
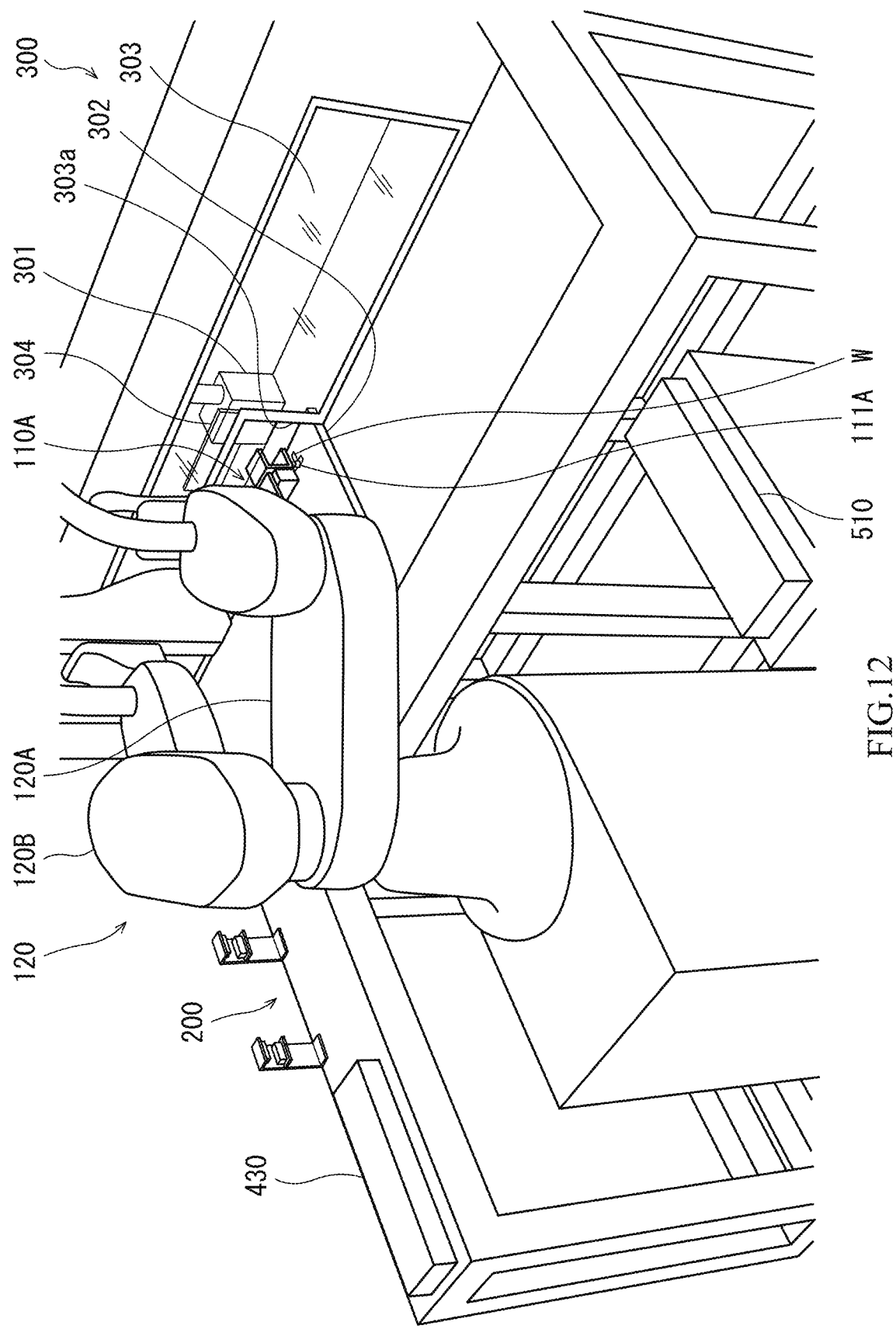
FIG. 12 is a perspective view showing one example of the state of the robot system that is operating in accordance with the flow chart of FIG. 7.

Next, in Step S108, as shown in FIG. 12, the control device 600 makes the press-bonding body 301 execute the press-bonding with respect to the workpiece W.

Next, in Step S109, after the press-bonding is completed, the control device 600 lifts the open-close window 304 to open the opening 303a.

Next, in Step S110, the control device 600 makes the robot arms 120A and 120B move the workpiece W to the outside of the press-bonding device 300, i.e., pull the workpiece W out.

Figure 13:
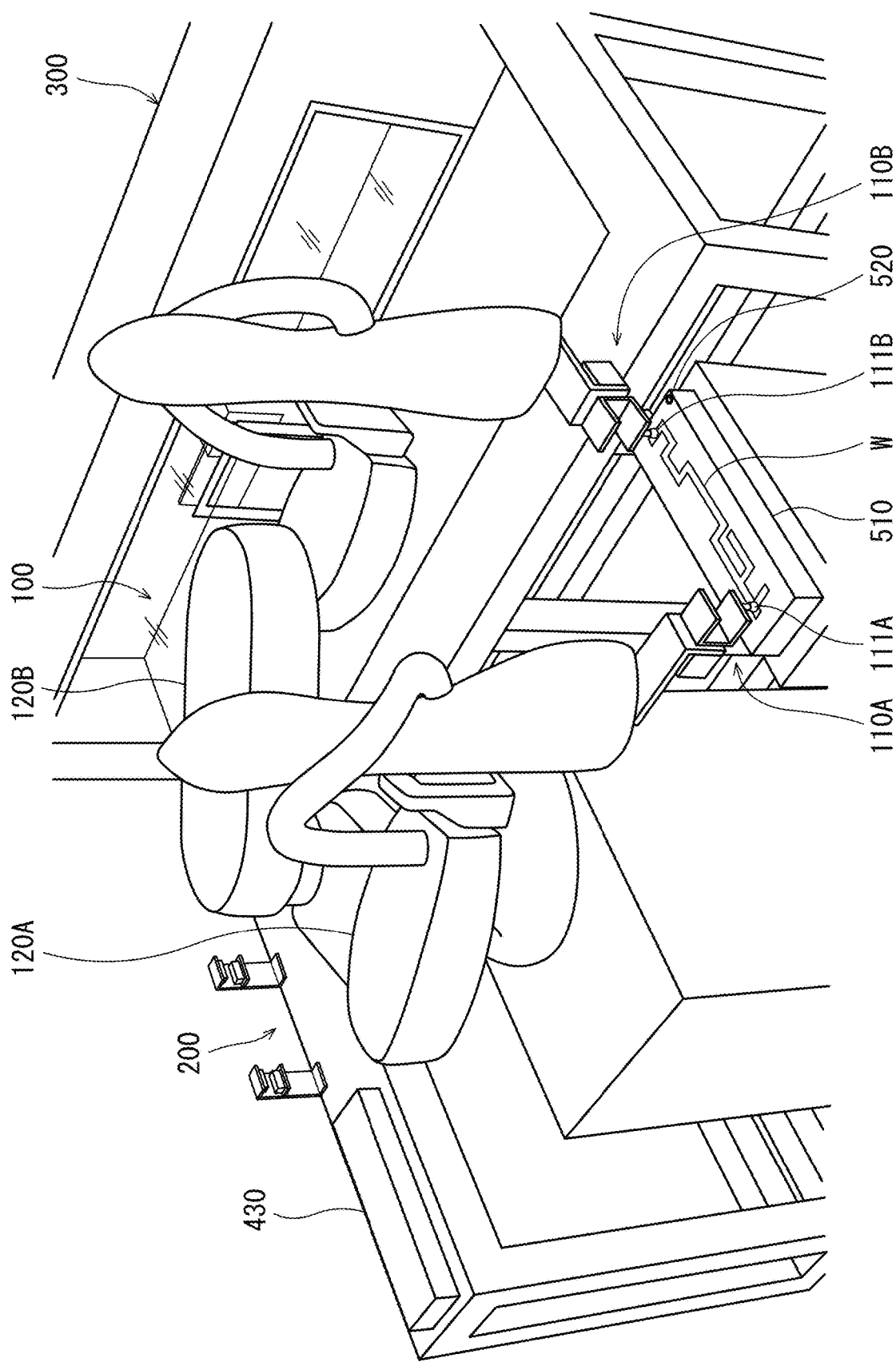
FIG. 13 is a perspective view showing one example of the state of the robot system that is operating in accordance with the flow chart of FIG. 7.

Next, in Step S111, as shown in FIG. 13, the control device 600 makes the robot arms 120A and 120B arrange the workpiece W at the predetermined position on the temporary placing base 510 of the second conveying device 500. In the process of moving the workpiece W, the control device 600 removes the twisting, etc., which is applied to the workpiece W. Specifically, the control device 600 makes the second robot arm 120B and the turning device 114B operate in accordance with a procedure opposite to the procedure of the operations executed in Step S105. With this, the robot arms 120A and 120B and the end effectors 110A and 110B hold the workpiece W in the same state as in Step S102.

Next, in Step S112, the control device 600 detects the existence of the workpiece W on the temporary placing base 510 based on the detection signal of the conveyance sensor 520. After the detection, the control device 600 makes the robot 530 of the second conveying device 500 convey the workpiece W to the third workspace WS3.

Through Steps S101 to S112 described above, the robot system 1 performs the press-bonding with respect to one workpiece W conveyed from the first workspace WS1 to the second workspace WS2 and then conveys the workpiece W to the third workspace WS3. Moreover, after the completion of Step S102 and simultaneously with Step S103, the control device 600 may execute Step S101 and the subsequent steps with respect to the next workpiece W of the first workspace WS1. With this, the workpieces W can be continuously subjected to the press-bonding and conveyed to the third workspace WS3.

Modified Example

The configuration of an end effector 110C according to the modified example will be described. The end effector 110C according to the present modified example realizes functions including the functions of the end effectors 110A and 110B. Hereinafter, differences of the present modified example from the embodiment will be mainly described, and the same explanations as the embodiment will be suitably omitted.

Figure 14:
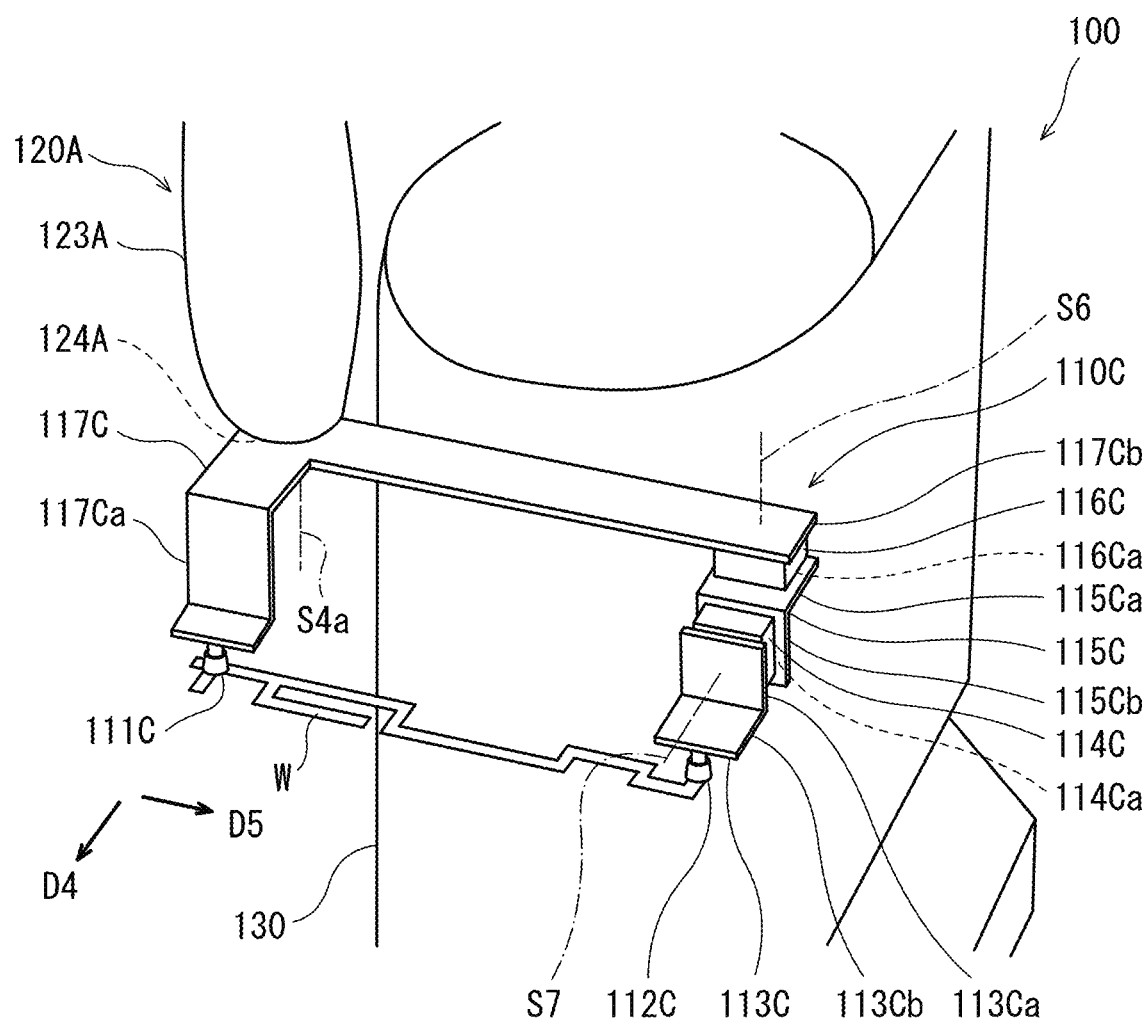
FIG. 14 is a perspective view showing one example of the configuration of the end effector according to a modified example.
Figure 15:
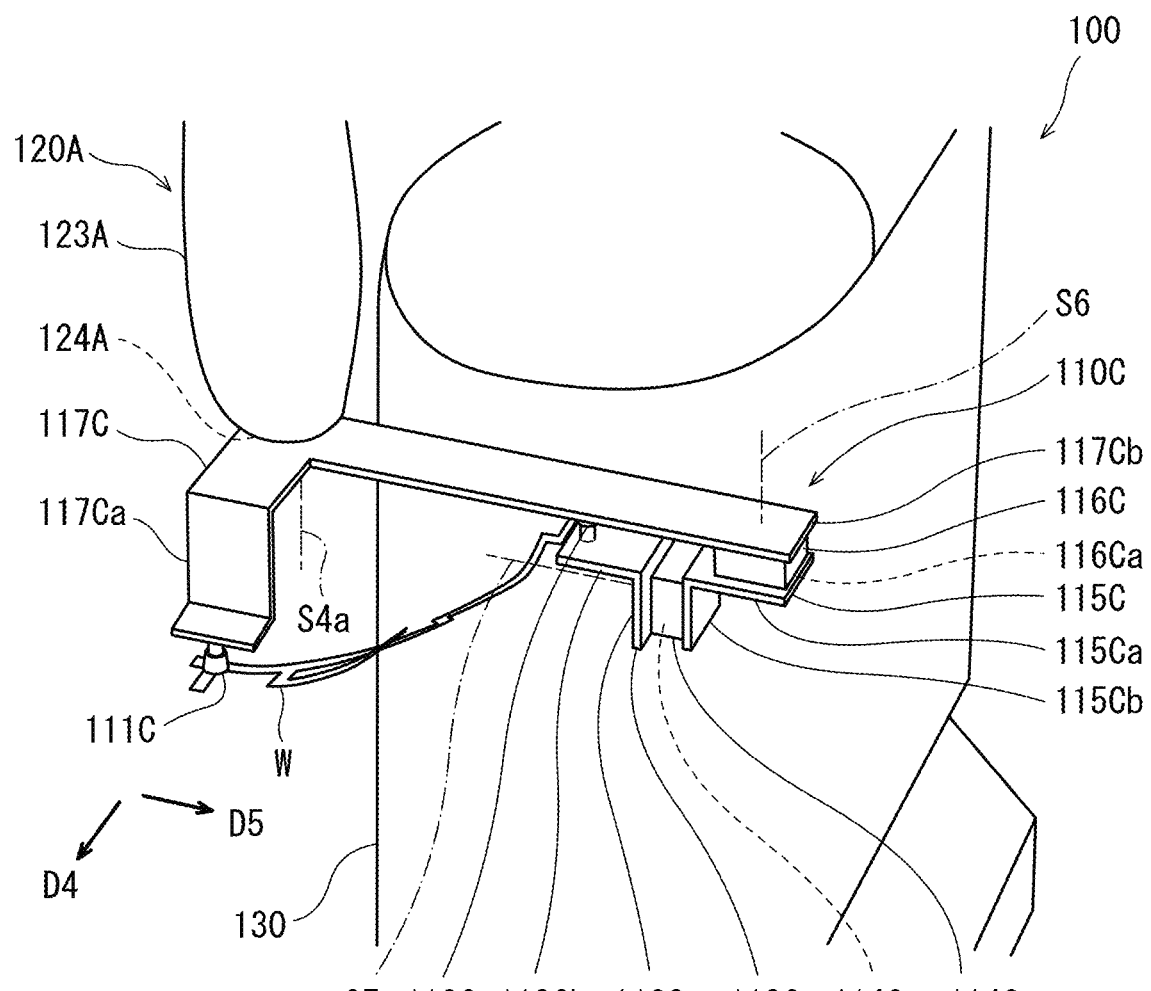
FIG. 15 is a perspective view showing one example of the configuration of the end effector according to the modified example.

FIGS. 14 and 15 are perspective views each showing one example of the configuration of the end effector 110C according to the modified example. FIG. 14 shows that the end effector 110C of the first robot arm 120A holds the workpiece W that is in a non-twisted state, and FIG. 15 shows that the end effector 110C of the first robot arm 120A holds the workpiece W that is in a twisted state. The end effector 110C that also serves as the end effectors 110A and 110B may be arranged at each of the robot arms 120A and 120B or may be arranged at only one of the robot arms 120A and 120B. In the latter case, the robot 100 may include only one robot arm and does not have to be a double-arm robot.

As shown in FIGS. 14 and 15, the end effector 110C includes a first suction structure 111C, a second suction structure 112C, a first support 113C, a first turning structure 114C, a second support 115C, a second turning structure 116C, and a base 117C. The suction structures 111C and 112C are the same in configuration as the suction structures 111A and 111B according to the embodiment.

The base 117C is detachably connected to the mechanical interface of the link 124A of the robot arm 120A or the mechanical interface of the link 124B of the robot arm 120B. The base 117C supports the suction structures 111C and 112C. The base 117C integrally includes a first portion 117Ca and a second portion 117Cb.

The first portion 117Ca includes, for example, a plate-shaped member having a Z-shaped section. The first portion 117Ca extends in a fourth direction D4 from a connection portion between the base 117C and the link 124A, extends toward the lower side, and extends in the fourth direction D4. The fourth direction D4 is a horizontal direction substantially perpendicular to the fourth axis S4a. The second portion 117Cb includes, for example, a linear plate-shaped member and extends from the above connection portion in a fifth direction D5. The fifth direction D5 is a horizontal direction substantially perpendicular to the fourth axis S4a and the fourth direction D4.

The first suction structure 111C is attached to a tip portion of the first portion 117Ca at the lower side of the tip portion such that an open end of the first suction structure 111C is directed toward the lower side. The second turning structure 116C is connected to a tip portion of the second portion 117Cb at the lower side of the tip portion. The second turning structure 116C couples the second support 115C to the second portion 117Cb such that the second support 115C is turnable about a sixth axis S6. The second turning structure 116C includes a turning device 116Ca that turns the second support 115C by the control of the control device 600. The turning device 116Ca is the same in configuration as each of the turning devices 114A and 114B according to the embodiment. A direction along the sixth axis S6 is substantially parallel to a direction along the fourth axis S4a. The turning of the second support 115C about the sixth axis S6 realizes the same behavior as the turning of the base 113B of the second end effector 110B about the fourth axis S4b in the embodiment. The second turning structure 116C is one example of the moving device.

The second support 115C is arranged at the lower side of the second turning structure 116C. The second support 115C includes, for example, a plate-shaped member having an L-shaped section. The second support 115C integrally includes a first portion 115Ca and a second portion 115Cb substantially perpendicular to each other. The first portion 115Ca is connected to the second turning structure 116C and extends in a horizontal direction substantially perpendicular to the sixth axis S6. The second portion 115Cb extends substantially parallel to the sixth axis S6 from the first portion 115Ca toward the lower side. The second portion 115Cb is located away from the sixth axis S6.

The first turning structure 114C is connected to the second portion 115Cb at an opposite side of the second portion 115Cb from the first portion 115Ca and couples the second portion 115Cb and the first support 113C such that the first support 113C is turnable about a seventh axis S7. The first turning structure 114C includes a turning device 114Ca that turns the first support 113C by the control of the control device 600. The turning device 114Ca is the same in configuration as the turning device 116Ca. A direction along the seventh axis S7 is a horizontal direction substantially perpendicular to the direction along the sixth axis S6. The turning of the first support 113C about the seventh axis S7 realizes the same behavior as the turning of the support 112B of the second end effector 110B about the fifth axis S5b in the embodiment. The first turning structure 114C is one example of the moving device.

The first support 113C is arranged at the lateral side of the first turning structure 114C. The first support 113C includes, for example, a plate-shaped member having an L-shaped section. The first support 113C integrally includes a first portion 113Ca and a second portion 113Cb substantially perpendicular to each other. The first portion 113Ca is connected to the first turning structure 114C and extends in a vertical direction substantially perpendicular to the seventh axis S7. The second portion 113Cb extends substantially parallel to the seventh axis S7 from the first portion 113Ca toward the lateral side. The second portion 113Cb is located away from the seventh axis S7. The second suction structure 112C is attached to a surface of the second portion 113Cb at an opposite side of the second portion 113Cb from the first portion 113Ca and is arranged such that an open end of the second suction structure 112C is directed in a direction substantially perpendicular to the surface of the second portion 113Cb.

According to the above configuration, the first suction structure 111C can change its position relative to the link 123A by turning about the fourth axis S4a. The second suction structure 112C can change its position and posture relative to the link 123A and the first suction structure 111C by turning about the fourth axis S4a, the sixth axis S6, and the seventh axis S7.

For example, as shown in FIG. 14, the end effector 110C can locate the suction structures 111C and 112C at respective height positions, which are the same in height as each other in the vertical direction, with the open ends thereof directed toward the lower side and can arrange the suction structures 111C and 112C in an arrangement direction along the fifth direction D5.

For example, as shown in FIG. 15, the end effector 110C makes the second turning structure 116C turn the second support 115C around the sixth axis S6. With this, the end effector 110C can bring the second suction structure 112C closer to the first suction structure 111C and retreat the second suction structure 112C relative to the arrangement direction along the fifth direction D5. The end effector 110C can retreat the second suction structure 112C relative to a virtual line in a direction intersecting with the virtual line. The virtual line is a line along which the suction structures 111C and 112C are lined up in the fifth direction D5, i.e., the virtual line is a line extending in the arrangement direction. Moreover, the end effector 110C makes the first turning structure 114C turn the first support 113C around the seventh axis S7. With this, the end effector 110C can locate the second suction structure 112C at the upper side of the first suction structure 111C and can direct the open end of the second suction structure 112C toward the upper side. Therefore, the end effector 110C can apply an action, such as the same twisting as the embodiment, to the workpiece W held as shown in FIG. 14.

In FIGS. 14 and 15, the second suction structure 112C is arranged in the fifth direction D5 relative to the first suction structure 111C but is not limited to this. For example, the second suction structure 112C may be arranged in a direction opposite to the fifth direction D5.

The end effector 110C according to the present modified example moves the second suction structure 112C by turning the second support 115C around the sixth axis S6. However, the present modified example is not limited to this. For example, the end effector 110C according to the present modified example may move the second suction structure 112C by parallel movement of the second support 115C.

The end effector 110C according to the present modified example may include another turning structure. For example, the end effector 110C may include a turning device that is located between the base 117C and the link 124A and turns about an axis along the fourth direction D4 and/or an axis along the fifth direction D5. With this, the end effector 110C can change the directions of the suction structures 111C and 112C.

OTHER EMBODIMENTS

The foregoing has described the examples of the embodiment of the present disclosure. However, the present disclosure is not limited to the above embodiment and the above modified example. To be specific, various modifications and improvements may be made within the scope of the present disclosure. For example, modes prepared by variously modifying the above embodiment and the above modified example and modes prepared by combining the components in the above embodiment and the above modified example are included within the scope of the present disclosure.

For example, in the embodiment and the modified example, the robot 100 is a double-arm robot including the robot arms 120A and 120B. However, the embodiment and the modified example are not limited to this. For example, the robot 100 may include only one arm or may include three or more arms. For example, the robot arms 120A and 120B may be mounted on respective robots.

In the embodiment and the modified example, each of the suction structures 111A, 111B, 111C, and 112C of the end effectors 110A to 110C sucks an object by the generation of negative pressure. However, the embodiment and the modified example are not limited to this. For example, the suction structure may adhere to an object by adhesive force. Or, the suction structure may include a suction cup made of rubber, resin, or the like having flexibility and may suck an object by pressing the suction cup against the object. Furthermore, to increase suction force, a structure that draws out air of a suction surface of the suction cup may be disposed.

In the embodiment and the modified example, each of the number of suction structures 111A, the number of suction structures 111B, the number of suction structures 111C, and the number of suction structures 112C in each of the end effectors 110A to 110C is one. However, the embodiment and the modified example are not limited to this, and each of the number of suction structures 111A, the number of suction structures 111B, the number of suction structures 111C, and the number of suction structures 112C may be two or more.

In the embodiment and the modified example, the robot 100 that is an industrial robot is described as an example of a mechanical device to which the technique of the present disclosure is applicable. However, the mechanical device to which the technique of the present disclosure is applicable may be a mechanical device other than the industrial robot. For example, the mechanical device may be a service robot, a construction machine, a tunnel boring machine, a crane, a loading carrier, a humanoid, or the like. The service robot is a robot used in various service industries, such as care giving, medical care, cleaning, security, guidance, rescue, cooking, and product offerings.

A technique of the present disclosure may be a control method. For example, a control method according to one aspect of the present disclosure is a control method of conveying a plate-shaped member having flexibility by using a first robot arm including a first suction structure and a second robot arm including a second suction structure that is turnable by a turning device. The control method includes: operating the first robot arm to make the first suction structure suck the plate-shaped member; operating the second robot arm to make the second suction structure suck the plate-shaped member; operating the first robot arm and the second robot arm to lift and move the sucked plate-shaped member; operating the second robot arm to retreat the second suction structure relative to a direction along which the first suction structure and the second suction structure are located; operating the turning device to turn the second suction structure such that the second suction structure is directed in a direction different from the first suction structure; and operating the first robot arm and the second robot arm to move the plate-shaped member twisted by the turning of the second suction structure and introduce a portion of the plate-shaped member to a conveyance destination, the portion of the plate-shaped member being a portion sucked by the first suction structure. This control method may be realized by a CPU, a circuit (such as an LSI), an IC card, a single module, or the like.

The technique of the present disclosure may be a program for executing the above control method or may be a non-transitory, computer-readable recording medium that stores the above program therein. Furthermore, needless to say, the above program is distributable via a transmission medium, such as the Internet.

All the numerals, such as the ordinal numbers and the numbers, are examples used to specifically describe the technique of the present disclosure, and the present disclosure is not limited to these numerals. Furthermore, connection relations among the components are examples used to specifically describe the technique of the present disclosure, and the connection relations that realize the functions of the present disclosure are not limited to these.

The division of the blocks in the functional block diagram is one example. Plural blocks may be realized as one block, one block may be divided into plural blocks, and/or some of the functions may be transferred to other blocks. The functions of plural blocks having similar functions may be processed by single hardware or software in parallel or in a time division manner.

The invention claimed is:

1. A holding device that holds a plate-shaped member having flexibility, the holding device comprising:
   a first suction structure that sucks the plate-shaped member;
   a second suction structure that sucks the plate-shaped member and is turnable and movable;
   a turner that turns the second suction structure; and
   a mover that moves the second suction structure, wherein
   when the first suction structure and the second suction structure suck and hold the plate-shaped member, the turning turner twists the plate-shaped member by turning the second suction structure such that the second suction structure is directed in a direction different from the first suction structure, and the mover bends the plate-shaped member by moving the second suction structure such that the second suction structure retreats relative to a direction along which the first suction structure and the second suction structure are located.

2. The holding device according to claim 1, wherein when twisting the plate-shaped member, the mover creates a deflection on the plate-shaped member by moving the second suction structure such that the second suction structure approaches the first suction structure.

3. The holding device according to claim 1, wherein when twisting the plate-shaped member, the mover moves the second suction structure to an upper side beyond the first suction structure.

4. The holding device according to claim 1, wherein:
   the first suction structure is arranged at a first robot arm;
   the second suction structure is arranged at a second robot arm; and
   the second robot arm serves as the mover.

5. The holding device according to claim 4, further comprising:
   a support that supports the second suction structure; and
   a base that is attached to the robot arm and is coupled to the support such that the support is turnable, wherein the turner turns the support.

6. The holding device according to claim 5, wherein:
the base is attached to a turnable end link of a tip of the robot arm; and
a direction of a turning axis of the support is a direction intersecting with a direction of a turning axis of the end link.

7. The holding device according to claim 1, wherein the first suction structure and the second suction structure are arranged at one robot arm.

8. The holding device according to claim 1, further comprising:
a second turner as the turner that turns the second suction structure; and
a first turner device that turns the first suction structure, wherein
the first suction structure is turnable.

9. A control method of conveying a plate-shaped member having flexibility by using a first robot arm including a first suction structure and a second robot arm including a second suction structure that is turnable by a turner, the control method comprising:
operating the first robot arm to make the first suction structure suck the plate-shaped member;
operating the second robot arm to make the second suction structure suck the plate-shaped member;
operating the first robot arm and the second robot arm to lift and move the sucked plate-shaped member;
operating the second robot arm to retreat the second suction structure relative to a direction along which the first suction structure and the second suction structure are located;
operating the turner device to turn the second suction structure such that the second suction structure is directed in a direction different from the first suction structure; and
operating the first robot arm and the second robot arm to move the plate-shaped member twisted by the turning of the second suction structure and introduce a portion of the plate-shaped member to a conveyance destination, the portion of the plate-shaped member being a portion sucked by the first suction structure.

10. The control method according to claim 9, further comprising:
operating the first robot arm and the second robot arm to make a sensor, which detects a position of the plate-shaped member, detect the sucked plate-shaped member; and
operating the first robot arm and the second robot arm based on a detection result of the sensor to adjust the position of the plate-shaped member relative to the conveyance destination.

11. The control method according to claim 9, wherein:
the second suction structure is attached to the second robot arm through a support and a base;
the support supports the second suction structure;
the base is attached to the second robot arm and is coupled to the support such that the support is turnable; and
the turner turns the support.

12. The control method according to claim 11, wherein:
the base is attached to a turnable end link of a tip of the second robot arm; and
a direction of a turning axis of the support is a direction intersecting with a direction of a turning axis of the end link.

13. The control method according to claim 9, wherein:
the second suction structure is turned by a second turner as the turner; and
the first suction structure is turnable and is turned by a first turner.

14. A control device that executes the control method according to claim 9.

15. A robot system comprising:
a first robot arm;
a second robot arm;
a first suction structure arranged at the first robot arm;
a second suction structure that is arranged at the second robot arm and is turnable;
a turner that turns the second suction structure; and
control circuitry that controls operations of the first robot arm, the second robot arm, and the turner, wherein:
the control circuitry operates the first robot arm and the second robot arm to suck and hold a plate-shaped member having flexibility by the first suction structure and the second suction structure;
when the plate-shaped member is held, the control circuitry operates the second robot arm to bend the plate-shaped member by retreating the second suction structure relative to a direction along which the first suction structure and the second suction structure are located, and the control circuitry twists the plate-shaped member by making the turner turn the second suction structure such that the second suction structure is directed in a direction different from the first suction structure; and
the control circuitry operates the first robot arm and the second robot arm to move the twisted plate-shaped member and introduce a portion of the plate-shaped member to a conveyance destination, the portion of the plate-shaped member being a portion sucked by the first suction structure.

16. The robot system according to claim 15, further comprising a sensor that detects a position of the plate-shaped member and outputs a detection result to the control circuitry, wherein
the control circuitry detects a relative position of the plate-shaped member relative to the first suction structure and the second suction structure based on the detection result of the sensor and controls a position of the plate-shaped member relative to the conveyance destination based on the relative position.

17. The robot system according to claim 15, wherein:
the second suction structure is attached to the robot arm through a support and a base;
the support supports the second suction structure;
the base is attached to the robot arm and is coupled to the support such that the support is turnable; and
the turner device turns the support.

18. The robot system according to claim 17, wherein:
the base is attached to a turnable end link of a tip of the robot arm; and
a direction of a turning axis of the support is a direction intersecting with a direction of a turning axis of the end link.

19. The robot system according to claim 15, further comprising:
a second turner as the turner that turns the second suction structure; and
a first turner that turns the first suction structure, wherein the first suction structure is turnable.

20. A robot system comprising:
a robot arm;
a first suction structure arranged at the robot arm;
a second suction structure that is arranged at the robot arm and is turnable;

a turner that turns the second suction structure;
a mover that moves the second suction structure; and
control circuitry that controls operations of the robot arm, the turner, and the mover, wherein:
the control circuitry operates the robot arm to suck and hold a plate-shaped member having flexibility by the first suction structure and the second suction structure;
when the plate-shaped member is held, the control circuitry bends the plate-shaped member by making the mover retreat the second suction structure relative to a direction along which the first suction structure and the second suction structure are located, and the control circuitry twists the plate-shaped member by making the turner device turn the second suction structure such that the second suction structure is directed in a direction different from the first suction structure; and
the control circuitry operates the robot arm to move the twisted plate-shaped member and introduce a portion of the plate-shaped member to a conveyance destination, the portion of the plate-shaped member being a portion sucked by the first suction structure.

* * * * *